United States Patent
Brown et al.

(10) Patent No.: US 11,299,614 B2
(45) Date of Patent: Apr. 12, 2022

(54) SUSTAINABLE, ENERGY-CURABLE POLYESTER POLYOLS AND COATINGS OR RIGID FOAMS THEREFROM

(71) Applicant: CARLISLE CONSTRUCTION MATERIALS, LLC, Scottsdale, AZ (US)

(72) Inventors: Matthew Thomas Brown, Novi, MI (US); Michelle Samson, Van Buren Township, MI (US); Gary Spilman, Northville, MI (US); Rick Tabor, Plymouth, MI (US); Kevin Anthony Rogers, Detroit, MI (US)

(73) Assignee: CARLISLE CONSTRUCTION MATERIALS, LLC, Scottsdale, AZ (US)

( * ) Notice: Subject to any disclaimer, the term of this patent is extended or adjusted under 35 U.S.C. 154(b) by 419 days.

(21) Appl. No.: 16/548,296

(22) Filed: Aug. 22, 2019

(65) Prior Publication Data
US 2020/0002524 A1    Jan. 2, 2020

Related U.S. Application Data

(63) Continuation of application No. PCT/US2018/020565, filed on Mar. 2, 2018.
(Continued)

(51) Int. Cl.
*C08L 33/10* (2006.01)
*C08G 18/62* (2006.01)
(Continued)

(52) U.S. Cl.
CPC .......... *C08L 33/10* (2013.01); *C08G 18/6229* (2013.01); *C08G 63/918* (2013.01);
(Continued)

(58) Field of Classification Search
CPC ............ C08G 18/0823; C08G 18/1808; C08G 18/1816; C08G 18/227; C08G 18/246; C08G 18/348; C08G 18/4213; C08G 18/4216; C08G 18/4225; C08G 18/4227; C08G 18/4288; C08G 18/4238; C08G 18/664; C08G 18/6659; C08G 18/6229; C08G 18/68; C08G 18/722; C08G 18/73; C08G 18/755; C08G 18/7657; C08G 18/792; C08G 63/52; C08G 63/54; C08G 63/547; C08G 63/56; C08G 63/58; C08G 63/60; C08G 63/605; C08G 63/66; C08G 63/664; C08G 63/672; C08G 63/676; C08G 63/68; C08G 63/685; C08G 63/6852; C08G 63/6854; C08G 63/6856; C08G 63/6858; C08G 63/91; C08G 63/912; C08G 63/914; C08G 63/916; C08G 63/918; C08L 33/08; C08L 33/10; C08L 33/12; C08L 33/14; C08L 33/16; C08L 33/06; C08L 33/062; C08L 33/066; C08L 33/068; C08L 2203/14; C08L 2201/00; C08L 2201/06; C08L 2201/50; C08L 2201/52; C08L 2201/54; C08L 2201/56; C08L 75/06; C08L 75/12; C08L 75/14; C08L 75/16; C09D 133/00; C09D 133/02; C09D 133/04; C09D 133/06; C09D 133/062; C09D 133/066; C09D 133/068; C09D 133/08; C09D 133/10; C09D 133/12; C09D 133/14;
(Continued)

(56) References Cited

U.S. PATENT DOCUMENTS 4,539,341 A    9/1985  Hallmark et al.
4,608,432 A    8/1986  Magnus et al.
(Continued)

OTHER PUBLICATIONS

PCT International Search Report and Written Opinion dated May 22, 2018 in corresponding PCT/2018/020565, 26 pages.
(Continued)

*Primary Examiner* — Christopher M Rodd
(74) *Attorney, Agent, or Firm* — Dilworth IP, LLC

(57) ABSTRACT

Maleate polyester polyols and coatings made from the polyols are disclosed. The polyester polyols comprise recurring units of (a) a digested thermoplastic polyester or an aromatic dicarboxylate source; (b) a diol; (c) 5 to 95 mole % of an $\alpha,\beta$-unsaturated monomer; and (d) 5 to 95 mole % of adipic acid, succinic acid, or a mixture thereof, where the mole % ranges for (c) and (d) are based on the combined molar amounts of (c) and (d). The polyols have hydroxyl numbers within the range of 25 to 450 mg KOH/g, an average of 0.5 to 2.5 reactive unsaturation sites per molecule, and a viscosity less than 1500 cP at 75° C. The polyols are thermally curable or energy-curable. Coatings made from the maleate polyester polyols are also described. Traditional coatings based on polyisocyanates and/or (meth) acrylates can be made, in some cases with improved properties and reduced reliance on the acrylate or isocyanate-based components. Surprisingly, the maleate polyester polyols can also be cured directly using UV to produce coatings under ambient conditions without the need for either acrylic or isocyanate functionality, and this allows coating formulators to reduce cost and more easily achieve regulatory compliance without sacrificing important coating properties. Rigid polyisocyanurate and polyurethane foams produced from the maleate polyester polyols have improved fire retardance.

25 Claims, No Drawings

Related U.S. Application Data

(60) Provisional application No. 62/466,642, filed on Mar. 3, 2017, provisional application No. 62/582,447, filed on Nov. 7, 2017.

(51) Int. Cl.

| | | |
|---|---|---|
| *C08L 33/06* | (2006.01) | |
| *C08L 33/08* | (2006.01) | |
| *C08L 75/14* | (2006.01) | |
| *C09D 133/08* | (2006.01) | |
| *C09D 133/10* | (2006.01) | |
| *C09D 175/14* | (2006.01) | |
| *C08G 63/91* | (2006.01) | |

(52) U.S. Cl.
CPC .......... *C08L 33/066* (2013.01); *C08L 33/08* (2013.01); *C08L 75/14* (2013.01); *C09D 133/08* (2013.01); *C09D 133/10* (2013.01); *C09D 175/14* (2013.01); *C08L 2201/54* (2013.01); *C08L 2203/14* (2013.01)

(58) Field of Classification Search
CPC .. C09D 133/16; C09D 167/06; C09D 167/07; C09D 167/08; C09D 175/06; C09D 175/12; C09D 175/14; C09D 175/16; C08J 11/22; C08J 11/24; C08J 11/26; C08J 2375/14; C08J 2375/16; C08J 2367/04; C08J 2367/06; C08J 2367/07; C08J 2367/08
See application file for complete search history.

(56) References Cited

U.S. PATENT DOCUMENTS

| | | |
|---|---|---|
| 4,753,967 A | 6/1988 | Londrigan |
| 4,758,607 A | 7/1988 | Hallmark et al. |
| 4,892,919 A | 1/1990 | Leitheiser et al. |
| 5,155,163 A | 10/1992 | Abeywardena et al. |
| 5,252,615 A | 10/1993 | Rao et al. |
| 5,281,630 A | 1/1994 | Salsman |
| 5,371,112 A | 12/1994 | Sayre et al. |
| 5,380,793 A | 1/1995 | Pepper |
| 5,523,334 A | 6/1996 | White, III et al. |
| 5,608,000 A | 3/1997 | Duan et al. |
| 5,726,277 A | 3/1998 | Salsman |
| 5,763,526 A | 6/1998 | Harakawa et al. |
| 6,423,816 B1 | 7/2002 | Wamprecht et al. |
| 6,555,623 B1 | 4/2003 | Puckett et al. |
| 6,664,363 B1 | 12/2003 | Faunce |
| 6,696,521 B2 | 2/2004 | Yang et al. |
| 7,157,139 B2 * | 1/2007 | Salsman ............ C08G 18/4252 428/308.4 |
| 8,399,532 B2 | 3/2013 | Mulkey |
| 8,476,364 B2 | 7/2013 | Salsman |
| 8,497,316 B2 | 7/2013 | Darby et al. |
| 8,653,174 B2 | 2/2014 | Anderson |
| 9,006,379 B2 | 4/2015 | He et al. |
| 9,410,014 B2 | 8/2016 | Salsman |
| 9,447,225 B2 | 9/2016 | Tabor et al. |
| 9,481,760 B2 | 11/2016 | Mukerjee et al. |
| 9,809,674 B2 | 11/2017 | Shieh |
| 9,840,584 B2 | 12/2017 | Mukerjee et al. |
| 2006/0160986 A1 * | 7/2006 | Hazen ................ C08G 63/78 528/272 |
| 2009/0013162 A1 | 1/2009 | Nandan et al. |
| 2016/0053050 A1 * | 2/2016 | Tabor ................. C08G 18/6659 524/591 |
| 2016/0208044 A1 * | 7/2016 | Mukerjee ................ C08J 11/24 |

OTHER PUBLICATIONS

D. Paszun et al., Ind. Eng. Chem. Res. 36 (1997) 1373.
N. Ikladius, J. Elast. Plast. 32 (2000) 140.
K. Troev, J. Appl. Polym. Sci. 90 (2003) 1148.
D. Nelson, "Unsaturated Polyester Resins" in Reaction Polymers, Gun et al., eds. (1992) 158-160.
G. Rokicki et al., Polym. Adv. Tech. 26 (2015) 707.
J. Datta et al., Polym. Bull. 73 (1988) 2056.
U. Vaidya et al., Ind. Eng. Chem. Res. 26 (1987) 194.
U. Vaidya et al., Ind. Eng. Chem. Res. 27 (1988) 2056.
M. Ionescu et al., Cell. Polym. 16 (1997) 43.
C. Lin, Macromol. Symp. 135 (1998) 129.
J. Kim et al., Korean J. Chem. Eng. 24 (2007) 1076.
M. Lu et al., J. Appl. Polym. Sci. 80 (2001) 1052.

* cited by examiner

SUSTAINABLE, ENERGY-CURABLE POLYESTER POLYOLS AND COATINGS OR RIGID FOAMS THEREFROM

FIELD OF THE INVENTION

The invention relates to polyester polyol compositions produced from α,β-unsaturated monomers such as maleic anhydride and thermoplastic polyesters, including recycled or virgin polyethylene terephthalate. The polyols are sustainable and energy-curable and can be used to produce rigid foams and coatings.

BACKGROUND OF THE INVENTION

Polyester polyols are hydroxy-functional intermediates used to make polyurethane products, including foams, coatings, sealants, adhesives, and elastomers. Traditionally, most polyester polyols are built "from scratch" by polycondensation of glycols and dicarboxylic acids or their derivatives. Maleic anhydride is often listed as a potential building block for making the polyester polyols, although it is used less frequently in practice for polyester polyols, which cure predominantly through urethane chemistry. More recently, recycled thermoplastics such as polyethylene terephthalate, available from soda bottles or carpet fibers for instance, have been described as abundant raw materials for making sustainable polyester polyols.

Many urethane coatings require an elevated temperature cure, which can include baking in an oven. For large parts, this is often impractical, so coatings that can cure under ambient conditions with or without ultraviolet light are desirable. (Meth)acrylate and urethane-(meth)acrylate coatings are widely used because of their ability to cure completely using UV. However, numerous state and federal regulations that require reporting apply to most commonly used acrylic monomers. In addition, permissible and recommended exposure limits for workers are typically low, so the monomers must be handled with care. Desirably, reliance on acrylic monomers for energy-curable coatings could be reduced or eliminated.

Maleic anhydride is a ubiquitous raw material. It is commonly used as a component of unsaturated polyester resins ("UPR") rather than polyester polyols. In this application, the resin, which has unsaturation from incorporated maleic anhydride recurring units, cures with styrene and a free-radical catalyst to give a hard plastic, such as fiberglass. The resins are used to produce boat hulls, bathtubs, shower stalls, storage tanks, synthetic marble counters, automotive parts, and other applications. Itaconic acid and itaconic anhydride are available from natural sources, particularly from carbohydrate fermentation. Traditionally, α,β-unsaturated monomers such as maleic anhydride, fumaric acid, itaconic acid, and itaconic anhydride have been relatively infrequent components of polyester polyols.

Rigid polyurethane and polyisocyanurate foams are commonly used to insulate building, vehicles, and appliances. Foams having improved fire retardance without a need to rely further on expensive, leachable, bio-accumulative, plasticizing, toxic, and/or halogenated fire-retardant additives are in constant need.

Improved polyester polyols are needed. The industry would benefit from sustainable polyester polyols produced from waste streams of thermoplastic polyesters. Desirable polyols would have high recycle contents and could be produced from readily available starting materials. Ideally, the polyols could be used to make energy-curable coatings with reduced reliance on acrylic monomers or polyisocyanates. Valuable polyols would improve the fire retardance of rigid polyurethane foams, polyisocyanurate foams, and polymer coatings.

SUMMARY OF THE INVENTION

The invention relates to maleate polyester polyols and coatings made from the polyols. As used herein, "maleate polyester polyol" or "maleate polyol" refers to a polyester polyol that incorporates one or more units of an α,β-unsaturated monomer in the proportions specified further hereinbelow. An α,β-unsaturated monomer has a carbonyl group from a carboxylic acid, anhydride, or alkyl ester that is conjugated with at least one carbon-carbon double bond.

In one aspect, the invention relates to a maleate polyester polyol. The polyol comprises recurring units of (a) a digested thermoplastic polyester; (b) a diol; (c) 5 to 95 mole % of an α,β-unsaturated monomer; and (d) 5 to 95 mole % of adipic acid, succinic acid, or a mixture thereof. The mole % ranges for (c) and (d) are based on the combined molar amounts of (c) and (d). The polyol has a hydroxyl number within the range of 25 to 450 mg KOH/g, an average of 0.5 to 2.5 reactive unsaturation sites per molecule, and a viscosity less than 1500 cP at 75° C.

In another aspect, an aromatic dicarboxylate source replaces the digested thermoplastic polyester in the maleate polyester polyol.

The maleate polyester polyols are thermally curable or energy-curable. By "energy-curable," we mean that electromagnetic radiation in the form of visible light, ultraviolet (UV) light, or electron beam ("e-beam") can be used to self-crosslink the polyester polyol, crosslink the polyester polyol to one or more other components having reactive ethylenic unsaturation, or both.

In some aspects, the α,β-unsaturated monomer is selected from the group consisting of maleic anhydride, maleic acid, fumaric acid, itaconic acid, itaconic anhydride, alkyl esters thereof, substituted derivatives thereof, and mixtures thereof.

In other aspects, the α,β-unsaturated monomer is selected from the group consisting of acrylic acid, methacrylic acid, sorbic acid, methylene malonic acid, muconic acid, anhydrides thereof, alkyl esters thereof, substituted derivatives thereof, and mixtures thereof.

In some aspects, the invention includes coatings made from the maleate polyester polyols. Acrylate-free, isocyanate-free coatings can be made by UV-curing the polyester polyols described above, optionally in the presence of a photoinitiator. By "acrylate-free," we mean that the polyol is produced essentially without using acrylate or methacrylate monomers. Acrylate-free polyurethane or polyisocyanurate coatings can be made by reacting the polyester polyols with a polyisocyanate, a polyisocyanate dimer, or a polyisocyanate trimer under thermal conditions, energy-curing conditions, or both.

In other aspects, the invention includes coatings made by reacting a blend comprising a urethane-acrylate resin and the maleate polyester polyols under thermal conditions, energy-curing conditions, or both, optionally in the presence of a polyisocyanate, a polyisocyanate dimer, or a polyisocyanate trimer.

In yet other aspects, the invention includes a urethane-acrylate resin made by reacting, in a first step, the maleate polyester polyols with a polyisocyanate, a polyisocyanate dimer, or a polyisocyanate trimer to give an intermediate. In a second step, the intermediate is reacted with a hydroxyalkyl acrylate monomer to give the urethane-acrylate resin. The invention includes coatings made from the urethane-acrylate resins.

In other aspects, the invention includes an aqueous polyurethane dispersion made from the maleate polyester polyols as well as coatings from the polyurethane dispersions.

In yet other aspects, the invention includes a blend comprising a mono- or poly(meth)acrylate with the maleate polyester polyols above as well as coatings made from the blends.

The maleate polyester polyols of the invention can be incorporated into conventional (meth)acrylate, urethane, and urethane-(meth)acrylate coatings that are cured under energy-curing conditions, thermal conditions, or both to give products with excellent properties. We surprisingly found, however, that the maleate polyester polyols can also be cured directly using energy curing to produce coatings without the need for either acrylic or isocyanate functionality. Because (meth)acrylic monomer and isocyanate-based coatings can be expensive and must be formulated with care to comply with applicable health and safety regulations, the maleate polyols offer a cost-effective, less-burdensome alternative to producing ambient-cure coatings.

In other aspects, the inventive polyester polyols can be incorporated into rigid polyurethane or polyisocyanurate foams. Surprisingly, these foams have improved fire retardance when compared with similar foams made from polyols that include either recycled PET without maleic anhydride (or its equivalent) or maleic anhydride without recycled PET.

DETAILED DESCRIPTION OF THE INVENTION

1. Maleate Polyester Polyols

In one aspect, the invention relates to energy-curable maleate polyester polyols produced from and comprising recurring units from a thermoplastic polyester.

Thermoplastic polyesters suitable for use are well known in the art. They are condensation polymers produced from the reaction of glycols and aromatic dicarboxylic acids or acid derivatives. Examples include polyethylene terephthalate (PET); polybutylene terephthalate (PBT); polytrimethylene terephthalate (PTT); glycol-modified polyethylene terephthalate (PETG); copolymers of terephthalic acid and 1,4-cyclohexanedimethanol (PCT); PCTA (an isophthalic acid-modified PCT); polyhydroxy alkanoates, e.g., polyhydroxybutyrate; copolymers of diols with 2,5-furandicarboxylic acid or dialkyl 2,5-furandicarboxylates, e.g., polyethylene furanoate; copolymers of 2,2,4,4-tetramethyl-1,3-cyclobutanediol with isophthalic acid, terephthalic acid or orthophthalic derivatives; dihydroferulic acid polymers; and the like, and mixtures thereof. Further examples of polyester thermoplastics are described in *Modern Polyesters: Chemistry and Technology of Polyesters and Copolyesters*, J. Scheirs and T. Long, eds., Wiley Series in Polymer Science, 2003, John Wiley & Sons, Ltd. Hoboken, N.J. Other examples of thermoplastic polyesters may be found in Chapters 18-20 of *Handbook of Thermoplastics*, O. Olabisi, ed., 1997, Marcel Dekker, Inc. New York. Suitable thermoplastic polyesters include virgin polyesters, recycled polyesters, or mixtures thereof. Polyethylene terephthalate is particularly preferred, especially recycled polyethylene terephthalate (rPET), virgin PET, recycled PETG, virgin PETG, and mixtures thereof. For more examples of suitable thermoplastic polyesters, see U.S. Pat. Appl. Publ. No. 2009/0131625, the teachings of which are incorporated herein by reference.

Recycled polyethylene terephthalate suitable for use in making the inventive polyester polyols can come from a variety of sources. The most common source is the post-consumer waste stream of PET from plastic bottles or other containers. The rPET can be colorless or contain dyes (e.g., green, blue, or other colors) or be mixtures of these. A minor proportion of organic or inorganic foreign matter (e.g., paper, other plastics, glass, metal, etc.) can be present. A desirable source of rPET is "flake" rPET, from which many of the common impurities present in scrap PET bottles have been removed in advance. Another desirable source of rPET is pelletized rPET, which is made by melting and extruding rPET through metal filtration mesh to further remove particulate impurities. Because PET plastic bottles are currently manufactured in much greater quantity than any recycling efforts can match, scrap PET will continue to be available in abundance.

The thermoplastic polyesters are "digested" or "glycolyzed" by reaction with a diol to produce the digested thermoplastic polyester recurring units of the maleate polyester polyol.

Diols suitable for use are well known. By "diol," we mean a linear or branched, aliphatic or cycloaliphatic compound or mixture of compounds having two or more hydroxyl groups. Other functionalities, particularly ether or ester groups, may be present in the diol. In preferred diols, two of the hydroxyl groups are separated by from 2 to 10 carbons, preferably 2 to 5 carbons. Suitable diols include, for example, ethylene glycol, propylene glycol, 1,3-propanediol, 1,2-butylene glycol, 1,3-butylene glycol, 1,4-butanediol, 2-methyl-1,3-propanediol, pentaerythritol, neopentyl glycol, glycerol, trimethylolpropane, pentaerythritol, polyglycerols, 3-methyl-1,5-pentanediol, 1,4-cyclohexanedimethanol, 1,3-cyclohexanedimethanol, diethylene glycol, dipropylene glycol, triethylene glycol, 1,6-hexanediol, tripropylene glycol, tetraethylene glycol, polyethylene glycols having a number average molecular weight up to about 400 g/mol, block or random copolymers of ethylene oxide and propylene oxide, and the like, and mixtures thereof. Preferably, the diol is selected from propylene glycol, 2-methyl-1,3-propanediol, 3-methyl-1,5-pentanediol, neopentyl glycol, diethylene glycol, and mixtures thereof. Diethylene glycol is particularly preferred.

In some aspects, the thermoplastic polyester and diol are first heated, optionally in the presence of a catalyst, to give a digested intermediate. The digested intermediate will commonly be a mixture of diol reactant, diol(s) generated from the thermoplastic polyester, terephthalate oligomers, and other glycolysis products. For example, when PET or rPET is the thermoplastic polyester, the digested intermediate will include a mixture of diol reactant, ethylene glycol (generated from the PET or rPET), bis(2-hydroxyalkyl) terephthalate ("BHAT"), higher PET oligomers, and other glycolysis products. Similar digested mixtures in various forms have been made and characterized previously (see, e.g., D. Paszun et al., *Ind. Eng. Chem. Res.* 36 (1997) 1373 and N. Ikladious, *J. Elast. Plast.* 32 (2000) 140). Heating is advantageously performed at temperatures within the range of 80° C. to 260° C., preferably 100° C. to 250° C., more preferably 130° C. to 240° C., and most preferably 160° C. to 230° C.

In one aspect, when the thermoplastic polyester is polyethylene terephthalate, the digested intermediate comprises diols and a terephthalate component. The terephthalate component preferably comprises, by gel permeation chromatography using ultraviolet detection, 45 to 70 wt. % of bis(hydroxyalkyl)terephthalates. In a preferred aspect, the terephthalate component further comprises 20 to 40 wt. % of terephthalate dimers. In another preferred aspect, the terephthalate component of the digested intermediate comprises 45 to 65 wt. % of bis(hydroxyalkyl)terephthalates, 20 to 35 wt. % of terephthalate dimers, and 5 to 15 wt. % of terephthalate trimers. In another preferred aspect, the terephthalate component comprises 50 to 60 wt. % of bis(hydroxyalkyl)terephthalates, 25 to 30 wt. % of terephthalate dimers, and 8 to 12 wt. % of terephthalate trimers.

Catalysts suitable for making the digested intermediate are well known (see, e.g., K. Troev et al., *J. Appl. Polym. Sci.* 90 (2003) 1148). In particular, suitable catalysts comprise titanium, zinc, antimony, germanium, zirconium, manganese, or other metals. Specific examples include titanium alkoxides (e.g., tetrabutyl titanate or tetraisopropyl titanate), titanium(IV) phosphate, zirconium alkoxides, zinc acetate, lead acetate, cobalt acetate, manganese(II) acetate, antimony trioxide, germanium oxide, or the like, and mixtures thereof. Catalysts that do not significantly promote isocyanate reaction chemistries are preferred. As is discussed in more detail below, catalysts comprising titanium, particularly titanium alkoxides, are especially preferred. The amount of catalyst used is typically in the range of 0.005 to 5 wt. %, preferably 0.01 to 1 wt. %, more preferably 0.02 to 0.7 wt. %, based on the total amount of polyol being prepared.

Usually, the digestion reaction is performed by heating the thermoplastic polyester, diol(s), and any catalyst at least until the mixture liquefies and particles of the thermoplastic polyester are no longer apparent. Reaction times range from about 30 minutes to about 16 hours, more typically 1 to 10 hours, even more typically 3 to 8 hours, and will depend on the reaction temperature, source of the thermoplastic polyester, the particular diol reactant used, mixing rate, desired degree of depolymerization, and other factors that are within the skilled person's discretion.

The molar ratio of diol to thermoplastic polyester is preferably within the range of 1.5 to 4.5, more preferably 2.0 to 3.5.

In one aspect, the polyester polyol comprises recurring units of (a) an aromatic dicarboxylate source; (b) a diol; (c) 5 to 95 mole % of an α,β-unsaturated monomer; and (d) 5 to 95 mole % of adipic acid, succinic acid, or a mixture thereof; wherein the mole % ranges for (c) and (d) are based on the combined molar amounts of (c) and (d); wherein the polyol has a hydroxyl number within the range of 25 to 450 mg KOH/g, an average of 0.5 to 2.5 reactive unsaturation sites per molecule, and a viscosity less than 1500 cP at 75° C.; and wherein the polyol is thermally curable or energy-curable. In this aspect, the aromatic dicarboxylate source can be terephthalic acid, isophthalic acid, phthalic acid, trimellitic acid, and their related esters and anhydrides, including phthalic anhydride, dimethyl terephthalate (DMT), trimellitic anhydride, and the like, and mixtures thereof. In some cases, the aromatic dicarboxylate source can be part of a mixture from a side stream, waste stream, or bottoms product, as in DMT bottoms.

The maleate polyester polyol incorporates one or more units of an α,β-unsaturated monomer. Suitable α,β-unsaturated monomers have a carbonyl group from a carboxylic acid, anhydride, or alkyl ester that is conjugated with at least one carbon-carbon double bond. Suitable α,β-unsaturated monomers include, for example, maleic anhydride, maleic acid, fumaric acid, itaconic acid, itaconic anhydride, alkyl esters thereof, substituted derivatives thereof, and their mixtures. Other suitable α,β-unsaturated monomers include, for example, acrylic acid, methacrylic acid, sorbic acid, methylene malonic acid, muconic acid, anhydrides thereof, alkyl esters thereof, substituted derivatives thereof, and their mixtures.

The α,β-unsaturated monomer may be substituted at one or more alkenyl carbons. Suitable substituted derivatives of β-unsaturated monomers include, for example, diethyl [(dimethylamino)methylene]malonate, diethyl {[(6-methyl-2-pyridinyl) amino]methylene} malonate, dimethyl 2-[di(methylthio)methylene]malonate, dimethyl ((4-hydroxyphenyl)-methylene) malonate, dimethyl [hydroxy (methoxy)methylene] malonate, 2,3-diphenylmaleic anhydride, 2,3-dimethylmaleic anhydride; diethyl (2-dimethylamino)-fumarate; dimethyl (2-diethanolamino)fumarate, dimethyl (2-methylthio)fumarate, and their mixtures.

The maleate polyester polyols also incorporate recurring units of adipic acid, succinic acid, or both. In particular, the polyester polyol incorporates 5 to 95 mole % of the α,β-unsaturated monomer(s) and 5 to 95 mole % of adipic acid, succinic acid, or a mixture thereof, wherein these mole % ranges are based on the combined molar amounts of α,β-unsaturated monomer(s), adipic acid, and succinic acid. In preferred aspects, the polyester polyol incorporates 25 to 95 mole %, 50 to 90 mole %, or 55 to 88 mole %, of α,β-unsaturated monomer(s) and 5 to 75 mole %, 10 to 50 mole %, or 12 to 45 mole % of adipic acid, succinic acid, or a mixture thereof, wherein the mole % ranges are based on the combined molar amounts of α,β-unsaturated monomer(s), adipic acid, and succinic acid.

In some aspects, it may be beneficial to use maleic anhydride to make a "fumarate" polyol to take advantage of the higher reactivity of maleic anhydride versus fumaric acid for making the polyol. Because the trans-configuration of a fumarate has greater thermodynamic stability than the cis-configuration of a maleate, heat can be used to isomerize some or all of the maleate groups in a maleate polyol to produce fumarate groups. This may have advantages for improving certain properties of the ultimate coatings or rigid foams. As shown in Table 9 below, fumarate polyols may improve fire retardance for rigid foams when compared with similar maleate polyols. In the context of unsaturated polyester resin (UPR) synthesis, it is advantageous to have a high fumarate content because fumarate groups react faster than maleate groups with styrene under free-radical conditions to give better products (see, e.g., U.S. Pat. Nos. 6,555,623 and 6,696,521 and D. Nelson, "Unsaturated Polyester Resins," in *Reaction Polymers*, Gum et al., eds., (1992), pp. 153-160). As the latter reference describes, the elevated temperature conditions used for unsaturated polyester resin preparation promote isomerization to mostly fumarate groups when maleic anhydride is used as a reactant. In the present context, fumaric acid can be used as a reactant, or maleic anhydride can be used with enough heating to promote the isomerization, if desired.

In some aspects, the adipic acid and succinic acid can be part of a mixture such as the commercially available mixture of dibasic acids known as "DBA." A typical DBA composition might contain, for instance, 51-61 wt. % glutaric acid, 18-28 wt. % succinic acid, and 15-25 wt. % adipic acid.

In some aspects, the polyol can incorporate one or more other anhydrides, diesters, or dicarboxylic acids in addition to the α,β-unsaturated monomer(s), adipic acid or succinic acid. Suitable dicarboxylic acids include, for example, glutaric acid, cyclohexane dicarboxylic acids, phthalic acid, 1,5-furandicarboxylic acid, dimer or trimer fatty acids, isophthalic acid, and anhydrides thereof (e.g., phthalic anhydride).

In some aspects, the polyester polyol may incorporate recurring units from one or more hydrophobes. When a hydrophobe is included, it is preferably included in an amount within the range of 0.1 to 1.0 moles of hydrophobe per mole of thermoplastic polyester. In other aspects, the hydrophobe is present in an amount within the range of 0.15 to 0.8 moles of hydrophobe per mole of thermoplastic polyester. Suitable hydrophobes are well known. Examples include dimer fatty acids, oleic acid, ricinoleic acid, tung oil, corn oil, canola oil, soybean oil, sunflower oil, triglycerides or alkyl carboxylate esters having saturated or unsaturated $C_6$-$C_{36}$ fatty acid units, castor oil, alkoxylated castor oil, saturated or unsaturated $C_6$-$C_{18}$ dicarboxylic acids or diols, cardanol-based products, recycled cooking oil, branched or linear $C_6$-$C_{36}$ fatty alcohols, hydroxy-functional materials derived from epoxidized, ozonized, or hydroformylated fatty esters or fatty acids, and mixtures thereof. For additional examples, see U.S. Pat. No. 9,840,584 and U.S. Publ. No. 2016/0053050, the teachings of which are incorporated herein by reference.

In some aspects, the polyester polyol may incorporate lignins, tannins, or combinations thereof as described in U.S. Pat. No. 9,481,760, the teachings of which are incorporated herein by reference. When present, the lignin or tannin is preferably used in an amount within the range of 0.1 to 35 wt. %, or 2 to 25 wt. %, based on the amount of polyester polyol. Suitable lignins include alkali lignins, organosolv lignins, or combinations thereof. Lignin can impart fire retardance (FR) to polyols based on recycled thermoplastic polyesters, and that FR value can be enhanced by including maleic anhydride, maleic acid, itaconic acid, itaconic anhydride, or fumaric acid (see Table 11, below).

In some aspects, the polyester polyol consists essentially of or consists of recurring units of (a) a digested thermoplastic polyester; (b) a diol; (c) 5 to 95 mole % of an α,β-unsaturated monomer; and (d) 5 to 95 mole % of adipic acid, succinic acid, or a mixture thereof; wherein the mole % ranges for (c) and (d) are based on the combined amounts of (c) and (d); and wherein the polyol has a hydroxyl number within the range of 25 to 450 mg KOH/g, an average of 0.5 to 2.5 reactive unsaturation sites per molecule, and a viscosity less than 1500 cP at 75° C.

In some aspects, a digested intermediate is not made. Instead, the maleate polyester polyol is made in a single step by reacting the thermoplastic polyester, diol, α,β-unsaturated monomer(s), adipic and/or succinic acid under conditions effective to produce the polyol. As with polyols made using the two-step process, the polyol has a hydroxyl number within the range of 25 to 450 mg KOH/g, an average of 0.5 to 2.5 reactive unsaturation sites per molecule, and a viscosity less than 1500 cP at 75° C.

In some aspects, the maleate polyester polyols will comprise 5 to 40 wt. %, 5 to 35 wt. %, or 20 to 35 wt. % of digested thermoplastic polyester recurring units based on the amount of polyester polyol.

The maleate polyester polyols have hydroxyl numbers within the range of 25 to 450 mg KOH/g, preferably 25 to 350 mg KOH/g, 56 to 300 mg KOH/g, or 112 to 250 mg KOH/g, even more preferably 120 to 200 mg KOH/g or 120 to 160 mg KOH/g. Hydroxyl number can be measured by any accepted method for such a determination, including, e.g., DIN 53240-2 ("Determination of Hydroxyl Value—Part 2: Method with Catalyst").

The maleate polyester polyols preferably have number-average molecular weights (Mn) as measured by gel-permeation chromatography within the range of 400 to 2000 g/mol, or 500 to 1000 g/mol.

The maleate polyester polyols have average hydroxyl functionalities (i.e., the average number of —OH groups per molecule) within the range of 1.8 to 3.0, preferably 1.9 to 2.7, and more preferably 2.0 to 2.5.

The maleate polyester polyols have an average of 0.5 to 2.5 reactive unsaturation sites per molecule, preferably 0.8 to 2.4 or 1.0 to 2.3 reactive unsaturation sites per molecule. These unsaturation sites are olefinic rather than aromatic, and they originate at least in part, and in some aspects completely, from the α,β-unsaturated monomer reactant.

The maleate polyester polyols are flowable liquids, at least when warmed to 75° C., and preferably also under ambient conditions. Preferably, the polyols have viscosities measured at 75° C. less than 1,500 cP, more preferably less than 1,200 cP, most preferably less than 750 cP. A preferred range for the polyol viscosity is 50 to 1,000 cP at 75° C., more preferably 50 to 500 cP at 75° C. Viscosity can be determined by any industry-accepted method. It is convenient to use, for instance, a Brookfield viscometer (such as a Brookfield DV-III Ultra rheometer) fitted with an appropriate spindle, and to measure a sample at several different torque settings to ensure an adequate confidence level in the measurements.

The maleate polyester polyols preferably have low to intermediate acid numbers. Urethane manufacturers will often require that a polyol have an acid number below a particular specification. Low acid numbers can be ensured by driving reactions by removal of water from the reaction mixture to the desired level of completion. Preferably, the polyols have an acid number less than 30 mg KOH/g, more preferably 5 to 20 mg KOH/g, and most preferably less than 10 mg KOH/g. Acid numbers can be adjusted if necessary for a particular application with an acid scavenger such as, for example, an epoxide derivative, and this treatment can be performed by the manufacturer, distributor, or end user.

An advantage of the maleate polyester polyols is their reduced reliance on bio- or petrochemical sources for raw material. Preferably, the polyols include greater than 10 wt. %, more preferably greater than 25 wt. %, most preferably greater than 40 wt. % of recycle content. A preferred range for the recycle content is 25 to 100 wt. %. By "recycle content," we mean the combined amounts of thermoplastic polyester and any recycled diol, α,β-unsaturated monomer(s), adipic acid, or succinic acid. Some diols, such as propylene glycol or ethylene glycol, are available as recovered or recycled materials. For instance, propylene glycol is used in deicing fluids, and after use, it can be recovered, purified, and reused. Recycle content can be calculated, for instance, by combining the masses of thermoplastic polyester and any recycled diol or recycled dicarboxylic acid derivatives, dividing this sum by the total mass of reactants, and then multiplying the result by 100.

Tables 1 and 8, below, provide examples of the inventive maleate polyester polyols and representative properties.

The inventive maleate polyols can be used in combination with other polyols, including polyester polyols, polyether polyols, polycarbonate polyols, or the like, for the preparation of polyurethane and polyisocyanurate applications, including coatings, adhesives, sealants, elastomers, microcellular elastomers, flexible foams, rigid foams, and the like.

For the production of rigid foams, the maleate polyols can be combined, for instance, with polyols that have functionalities from 1.7 to 8.0 and hydroxyl numbers preferably within the range of 25 to 650 mg KOH/g, more preferably 50 to 450 mg KOH/g, and most preferably from 100 to 400 mg KOH/g. Examples include sucrose/glycerine-initiated polyether polyols; aromatic amine-initiated polyether polyols; aliphatic amine-initiated polyether polyols; Mannich polyols; novolac polyether polyols, alkoxylated bisphenol polyether polyols; α-methyl glucoside polyether polyols; aromatic polyester polyols; sucrose/amine-initiated polyether polyols; sorbitol-initiated polyether polyols; glycerine/sucrose-initiated polyether polyols; alkanolamine-initiated polyether polyols; lignin; glycerine-initiated polyether polyols; lignin-based polyether polyols; lignin-based polyester polyols; and vegetable oil-based polyols.

In one aspect, the maleate polyols are used in combination with a polyester polyol based on a recycled thermoplastic polyester such as recycled polyethylene terephthalate (rPET). The blends can include, for instance, 1 to 99 wt. %, 5 to 90 wt. %, or 10 to 80 wt. % of the maleate polyol and 1 to 99 wt. %, 10 to 95 wt. %, or 20 to 90 wt. % of one or more other polyols. As shown in the examples below, such blends can be particularly useful for improving the fire retardance of rigid foams because a small proportion of maleate can have a substantial impact on fire retardance.

2. Coatings from the Maleate Polyester Polyols a. Acrylate-Free, Isocyanate-Free UV-Cured Coatings In one aspect, the invention relates to an acrylate-free, isocyanate-free coating made by UV-curing an inventive maleate polyester polyol as described above. As noted above, "acrylate-free" refers herein to polyols produced essentially without using acrylate or methacrylate monomers. Optionally, a photoinitiator is included. Most coatings are formulated using (meth)acrylates, isocyanates, or both. Surprisingly, the maleate polyester polyols can be cured directly using energy curing (visible light, UV light, e-beam) to produce coatings without the need for either (meth)acrylic or isocyanate functionality. Because (meth)acrylic and isocyanate-based coatings can be expensive and must be formulated with care to comply with health and safety regulations, the maleate polyols offer a cost-effective, less-burdensome alternative to producing ambient-cure coatings. Table 2, below, shows that the maleate polyester polyols can be cured directly with UV to give acrylate-free, isocyanate-free coatings with a desirable balance of properties.

Photoinitiators suitable for use are well known. In general, a photoinitiator absorbs UV and/or visible light and generates a reactive species, typically a free-radical or cationic initiator. Suitable photoinitiators include, for example, benzoin ethers, benzil ketals, α-dialkoxyketones, α-hydroxyketones, α-aminoketones, acylphosphine oxides, phenylglyoxylates, and the like. Specific examples include acetophenone, anisoin, anthraquinone, benzil, benzoin, benzoin methyl ether, benzophenone, 4-benzoylbiphenyl, 4,4'-bis(dimethylamino)benzophenone, camphorquinone, 2,2-diethoxyacetophenone, 4,4-dihydroxybenzophenone, 4-(dimethylamino)benzophenone, 4,4'-dimethylbenzil, 2,5-dimethylbenzophenone, 2-ethylanthraquinone, 3'-hydroxyacetophenone, 4'-hydroxyacetophenone, 3-hydoxybenzophenone, 4-hydroxybenzophenone, 2-methylbenzophenone, 3-methylbenzophenone, methylbenzoylformate, phenanthrenequinone, bis(2,4,6-trimethylbenzoyl)phenyl phosphine oxide, 1-hydroxycyclohexyl phenyl ketone and its mixtures with benzophenone, phenyl t-butyl ketone, 4-(2-hydroxyethoxy)phenyl t-butyl ketone, α,α-dimethoxy-α-phenylacetophenone, 2-benzyl-2-(dimethylamino)-1-[4-(4-morpholinyl)-phenyl]-1-butanone, 2-methyl-1-[4-(methylthio)phenyl]-2-(4-morpholinyl)-1-propanone, diphenyl (2,4,6-trimethylbenzoyl)phosphine oxide, and the like, and combinations thereof. Suitable photoinitiators are commercially available, including, for instance, the Irgacure® photoinitiators from BASF.

The amount of photoinitiator used depends on many factors within the skilled person's discretion, including, for instance, the nature of the maleate polyester polyol, the average number of reactive unsaturation sites, the curing conditions, choice of solvent, concentration, property requirements of the coating, and other factors. In general, however, the photoinitiator will be used in an amount within the range of 0.1 to 5 wt. %, or 0.2 to 4 wt. %, or 0.3 to 3 wt. % based on the amount of cured coating.

In some aspects, the polyester polyols are energy-curable essentially in the absence of a photoinitiator.

Acrylate-free, isocyanate-free coatings can be made by combining the inventive maleate polyester polyols, preferably with a photoinitiator and a suitable organic solvent (e.g., methyl ethyl ketone or the like), to produce a mixture having 20 to 80 wt. % solids, preferably 30 to 70 wt. % or 40 to 65 wt. % solids, applying the mixture to a surface, allowing the organic solvent to evaporate (or "flash"), then exposing the resulting coating to energy curing, e.g., ultraviolet radiation. For laboratory-scale operations, suitable UV curing conditions can include one or more passes through a benchtop unit such as a Heraeus Noblelight LC6B benchtop unit with a H+ bulb. Table 2 shows the results of testing some acrylate-free, isocyanate-free UV-cured coatings made from the maleate polyester polyols.

b. Acrylate-Free Polyisocyanate or Polyisocyanurate Coatings

Acrylate-free polyisocyanate or polyisocyanurate coatings can be made by reacting the inventive maleate polyester polyols with a polyisocyanate, a polyisocyanate dimer, or a polyisocyanate trimer under thermal conditions, energy-curing conditions, or both.

Suitable polyisocyanates, including polyisocyanate dimers and trimers, are well known in the art and include aromatic, aliphatic, and cycloaliphatic products. Examples include toluene diisocyanates (TDIs), methylene diphenylene diisocyanates (MDIs), polymeric MDIs, naphthalene diisocyanates (NDIs), hydrogenated MDIs, trimethyl- or tetramethylhexamethylene diisocyanates (TMDIs), hexamethylene diisocyanate (HDI), isophorone diisocyanates (IPDIs), cyclohexane diisocyanates (CHDIs), xylylene diisocyanates (XDI), hydrogenated XDIs, and the like. Aliphatic diisocyanates, such as hexamethylene diisocyanate and isophorone diisocyanates are preferred. Polyisocyanate dimers and trimers, such as HDI timer, are also preferred.

Acrylate-free polyisocyanate or polyisocyanurate coatings are conveniently made by combining the maleate polyester polyol with the polyisocyanate and other components, such as a solvent, a urethane catalyst, and any other additives at a desired free-NCO index within the range of 0.8 to 1.5, typically 0.9 to 1.2. The coatings are conveniently cured at elevated temperature with heat. Examples of this type of coating made from HDI trimer as the polyisocyanate are shown in Table 4.

c. Coatings from Blends of the Maleate Polyester Polyols and a Urethane-(meth)acrylate Resin In some aspects, the invention includes coatings made from blends of the inventive maleate polyester polyols and a urethane-(meth)acrylate resin. Suitable blends for the coatings can comprise 5 to 95 wt. %, 15 to 85 wt. %, or 25 to 75 wt. % of the maleate polyester polyol and 95 to 5 wt. %, 85 to 15 wt. %, or 75 to 25 wt. % of the urethane-(meth)acrylate resin. In preferred aspects, the maleate polyester polyol will comprise at least 25 mole %, or at least 50 mole %, preferably at least 75 mole %, of α,β-unsaturated monomer(s) based on the combined molar amounts of α,β-unsaturated monomer(s), adipic acid, and succinic acid.

Urethane-(meth)acrylate resins suitable for use are commercially available from Sartomer, Sun Chemical, DIC Products, Rahn, and other suppliers. They can also be synthesized by reacting polyether or polyester polyols with polyisocyanates to make an NCO-terminated prepolymer, followed by reaction of the free NCO groups with a hydroxyalkyl acrylate monomer such as 2-hydroxyethyl acrylate, 2-hydroxyethyl methacrylate, 2-hydroxypropyl acrylate, or 2-hydroxypropyl methacrylate to give the urethane-(meth)acrylate resin.

Urethane-(meth)acrylates are high-performance resins that combine toughness from urethanes with the energy-curability of acrylates. Drawbacks include relatively high cost and the regulatory restrictions discussed earlier that apply to polyisocyanates and acrylic monomers. By blending maleate polyester polyols with urethane-(meth)acrylate resins, the overall cost of the formulation can be reduced while reducing reliance on acrylate monomers or polyisocyanates. As shown in Table 3, below, excellent coatings can be made from blends comprising 75 wt. % maleate polyester polyol and only 25 wt. % urethane-(meth)acrylate resin when a high-maleate polyester polyol is use. Moreover, when compared with the urethane-(meth)acrylate control, the maleate/urethane-(meth)acrylate blend gives a coating with improved flexibility and better impact resistance.

d. Urethane-(meth)acrylate Coatings from the Maleate Polyester Polyols

The inventive maleate polyester polyols can be used instead of or in combination with the polyester or polyether polyols currently used to make urethane-(meth)acrylate resins as described above. We found that including adipic acid or succinic acid in the maleate polyol helps to impart flexibility and impact resistance to the coating compared with a urethane-(meth)acrylate coating made from an all-maleic anhydride polyester polyol (see Table 5).

e. Polyurethane Coatings from the Maleate Polyester Polyols

The inventive maleate polyester polyols can be used to improve properties of urethane coatings and enable curing both thermally and by energy curing. Traditional urethane coatings may require added heat to provide an effective cure, and this can be problematic for large parts that are not practical to cure in an oven. By including the inventive maleate polyester polyols, the resulting urethane coatings can be cured at least in part by energy curing. Table 6, below, shows that excellent polyurethane coatings can be made at 1.0 NCO/OH index with HDI trimer when the inventive maleate polyester polyols are used with both UV and thermal curing.

f. Polyurethane Coatings from PUDs

Polyurethane coatings can also be made from aqueous polyurethane dispersions (PUDs) where the PUD incorporates an inventive maleate polyester polyol. Numerous ways to formulate aqueous polyurethane dispersions are known and suitable for use. Preferably, the polyurethane dispersion is made by emulsifying an isocyanate-terminated prepolymer in water with the aid of an emulsifying agent. Water, a water-soluble polyamine chain extender, or a combination thereof may be used to react with the emulsified prepolymer. The prepolymer is preferably made by reacting an inventive maleate polyester polyol, a hydroxy-functional emulsifier, one or more auxiliary polyols, and one or more polyisocyanates (as described above in Section 2 (b)). The aqueous polyurethane dispersions are preferably used to formulate water-borne coatings, adhesives, sealants, elastomers, and similar urethane products, and they are particularly valuable for reducing reliance on solvents. For instance, the dispersions can be used to formulate low- or zero-VOC compositions.

Auxiliary polyols suitable for use are also well known. They include polyether polyols, aliphatic polyester polyols, aromatic polyester polyols, polycarbonate polyols, glycols, and the like. Preferred auxiliary polyols have average hydroxyl functionalities within the range of 2 to 6, preferably 2 to 3, and number average molecular weights within the range of 500 to 10,000, preferably 1,000 to 8,000. Preferred polyester polyols are condensation products of dicarboxylic acids and diols or triols (e.g., ethylene glycol, propylene glycol, 2-methyl-1,3-propanediol, 3-methyl-1,5-pentanediol, 1,4-butanediol, neopentyl glycol, glycerin, trimethylolpropane, 1,4-cyclohexanedimethanol, bisphenol A ethoxylates), especially diols. The dicarboxylic acids can be aliphatic (e.g., glutaric, adipic, succinic) or aromatic (e.g., phthalic), preferably aliphatic.

A hydroxy-functional emulsifier is also used to make the polyurethane dispersions. The role of this component is to impart water-dispersibility to the prepolymer, usually upon its combination with water and a neutralizing agent, such as an acid or base reactant. Thus, in one aspect, the hydroxy-functional emulsifier is an acid-functional diol such as dimethylolpropionic acid (DMPA) or dimethylolbutanoic acid (DMBA). The acid functionality in the resulting prepolymer allows for neutralization with an amine or other basic reactant to generate a water-dispersible urethane. The hydroxy-functional emulsifier can also be an amine, such as N-methyldiethanolamine. Neutralization of the resulting prepolymer with an acidic reagent renders it water dispersible. In other aspects, the hydroxy-functional emulsifier is nonionic, e.g., a polyethylene glycol monomethyl ether. In another aspect, the hydroxy-functional emulsifier may be a monol- or diol-functionalized poly(ethylene oxide), such as for example Ymer™ N120 dispersing monomer (product of Perstorp). Additionally, non-reactive, so-called "external emulsifiers," such as the triethanolamine salt of dodecylbenzene sulfonic acid, may be included in the aqueous phase to assist in the emulsification and stabilization of the prepolymer and resulting polyurethane dispersion.

In certain aspects, a chain terminator may be used to control the molecular weight of polyurethane polymer contained within the aqueous polyurethane dispersion. Monofunctional compounds, such as those containing hydroxyl, amino, and thio groups that have a single active hydrogen-containing group, are suitable chain terminators. Examples include alcohols, amines, thiols, and the like, especially primary and secondary aliphatic amines.

Chain extenders can also be included in making the polyurethane dispersion. In some aspects, the chain extender is added in an amount sufficient to react 5 to 105 mole % of free NCO groups present. Suitable chain extenders contain at least two functional groups that are capable of reacting with isocyanates, e.g., hydroxyl, thio, or amino groups in any combination. Suitable chain extenders include, for example, diols (ethylene glycol, propylene glycol, diethylene glycol, neopentyl glycol, 1,4-butanediol, 2-methyl-1,3-propanediol, 3-methyl-1,5-pentanediol, 1,4-cyclohexanedimethanol, and the like), di- and polyamines (ethylenediamine, diethylenetriamine, Jeffamine® T-403, Jeffamine® D-230, Jeffamine® ED-2001, Jeffamine® ED-600, Jeffamine® ED-900, 1,6-hexamethylenediamine, butylenediamine, hydrazine, piperazine, N-hydroxyethyl ethylenediamine) alkanolamines (ethanolamine, diethanolamine, N-methyl diethanolamine, and the like), dithiols, and the like. Diol chain extenders are preferably added during the preparation of the prepolymer, and prior to emulsification in water, while amine chain extenders are preferably added after emulsification in water.

In a typical example, the inventive maleate polyester polyol, an acid-functional diol (e.g., DMPA), and auxiliary polyols (e.g., polyethylene glycol 200 and a polyester polyol made from 3-methyl-1,5-pentanediol and adipic acid) are combined and reacted with a mixture of aliphatic diisocyanates (e.g., hexamethylene diisocyanate and isophorone diisocyanate) in the presence of a tin catalyst (e.g., dibutyltin dilaurate) or a bismuth catalyst (e.g., bismuth dioctanoate) and a solvent (e.g., acetone). The resulting prepolymer is then dispersed in a mixture of water, neutralizing agent (e.g., triethanolamine), and a silicone defoamer. The expected product is an aqueous polyurethane dispersion having high solids content, low viscosity, and desirable settling properties.

For more examples of suitable approaches for preparing aqueous polyurethane dispersions, see U.S. Pat. Nos. 5,155,163; 5,608,000; 5,763,526; 6,339,125; 6,635,723; 7,045,573; and 7,342,068, the teachings of which are incorporated herein by reference.

g. Non-Isocyanate Polyurethanes from the Maleate Polyester Polyols

In some aspects, the inventive maleate polyester polyols can be used to produce "non-isocyanate polyurethanes" (NIPU), i.e., polyurethanes produced without using isocyanates. Conventional polyurethanes are typically obtained from polyisocyanates (e.g., diisocyanates), polyols (e.g., polyesters or polyethers), and chain extenders. The isocyanate starting materials used in the conventional processes can pose health and/or environmental concerns. Thus, there are potential benefits in avoiding isocyanates in preparing polyurethanes. See, Rokicki, G. et al., "Non-isocyanate polyurethanes: synthesis, properties, and applications," *Polym. Adv. Technol,* 26 (2015) 707.

The inventive maleate polyester polyols can be used to prepare substantially isocyanate-free polyurethanes. Non-isocyanate polyurethanes can be prepared via the polycondensation of dialkyl carbamates and diols or polyols. These and other routes to NIPUs using diols and polyols have been reviewed (see J. Datta et al., *Polym. Bull.* 73 (2016) 1459).

The following illustrates the preparation of an NIPU via the polycondensation of a dialkylcarbamate and a diol (such as an inventive maleate polyester polyol):

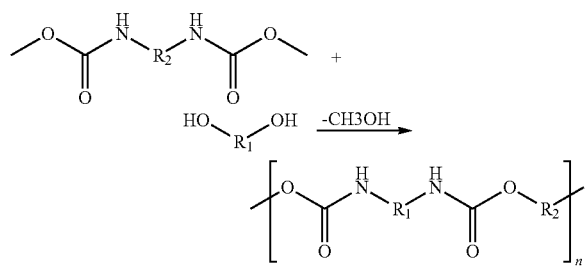

Another route has been commercialized by Dow Chemical (see U.S. Pat. Nos. 9,006,379 and 8,653,174, the teachings of which are incorporated herein by reference) and PARALOID™ EDGE 2121 Resin Solvent Borne Alkyd Carbamate product brochure, published as Dow Chemical document number 884-00828-0715-NAR-EN-BDC. This route involves the reaction of a di- or polycarbamate with a di- or polyaldehyde, as shown in the following scheme, whereby the di- or polycarbamate can be prepared by the reaction of a diol or polyol (e.g., the inventive maleate polyester polyol) with urea or an alkyl carbamate.

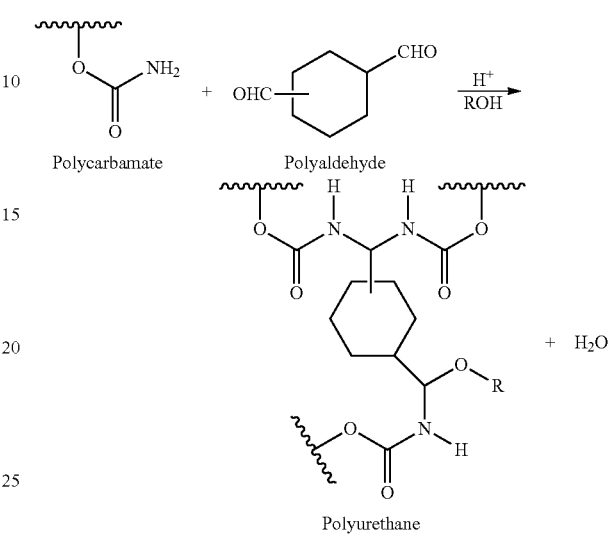

Alternatively, a diol or polyol (e.g., the inventive maleate polyester polyol) can be converted into an isocyanate-terminated prepolymer by reaction with a polyisocyanate. Reaction of the prepolymer with hydroxyethyl carbamate provides a di- or poly-carbamate. This polycarbamate can then be reacted with a polyaldehyde to provide a NIPU. Although this latter route uses a polyisocyanate, it does not require a polyurethane manufacturer to purchase a polyisocyanate. Instead, the end user would purchase only a polycarbamate resin and a polyaldehyde. This route thereby avoids exposure of the end user to relatively toxic polyisocyanates. Because this route avoids the need for a polyisocyanate by the end user, we include it as a way to form a substantially isocyanate-free polyurethane.

3. Rigid Foams from the Maleate Polyester Polyols

The inventive maleate polyester polyols can be used to formulate rigid polyurethane (PU) and polyisocyanurate (PIR) foams. In general, rigid PIR foams are formulated at a relatively high isocyanate index (e.g., 2.6) to allow for trimerization of free NCO groups, whereas rigid PU foams, such as those used for spray foam applications, are formulated at lower index (e.g., 1.2). A typical rigid foam formulation includes water, the maleate polyol, any other polyols, blowing agents, catalysts, and surfactants. Examples of suitable procedures and rigid foam formulations appear below.

We found that the inventive maleate polyols, which incorporate an α,β-unsaturated monomer and recycled thermoplastic polymer (e.g., rPET) can be used to improve the fire retardance of rigid foams (see Table 9, below). As little as 5 wt. % of an inventive maleate polyol blended with 95 wt. % of a non-maleate rPET polyol can significantly improve fire retardance as measured using CA TB-117 (see Table 10). Such an improvement is not observed from rPET polyols alone or from maleate polyols (e.g., a reaction product of PEG and maleic anhydride) alone, suggesting synergy between the rPET polyol and the unsaturated monomer (see Table 12).

In addition to coatings or rigid foams, the inventive maleate polyester polyols can be used to formulate a wide variety of urethane and non-urethane products. For instance, the polyols can be used for cellular, microcellular, and non-cellular applications including flexible foams, urethane dispersions, adhesives, sealants, and elastomers. The resulting products are potentially useful for automotive and transportation applications, building and construction products, marine products, packaging foam, flexible slabstock foam, carpet backing, appliance insulation, cast elastomers and moldings, footwear, biomedical devices, and other applications.

In other aspects, the inventive maleate polyester polyols may be derivatized to form mono- di- and polyacrylates via esterification or transesterification with acrylic acid or methacrylic acid-derived raw materials. Thus, in one aspect, the invention relates to a curable resin comprising a reaction product of an acrylate or methacrylate source and an inventive maleate polyester polyol. Examples of (meth)acrylation raw materials suitable for forming (meth)acrylate derivatives of the inventive polyester polyols include acryloyl chloride, methacryloyl chloride, methacrylic acid, acrylic acid, methyl acrylate, methyl methacrylate, and the like, or mixtures thereof. Such (meth)acrylate-derivatized inventive polyester polyols are useful for radiation or UV-cure coating formulations or applications.

In other aspects, the inventive maleate polyester polyols can be blended with mono- and/or poly(meth)acrylate resins and then UV-cured.

The following examples merely illustrate the invention; the skilled person will recognize many variations that are within the spirit of the invention and scope of the claims.

Preparation of Energy-Curable Polyester Polyols: General Procedure

A reactor equipped with an overhead mixer, condenser, heating mantle, thermocouple, and nitrogen inlet is charged with titanium(IV) butoxide (1500 ppm); recycled polyethylene terephthalate pellets (26-28 wt. % based on total of all charged reactants); and diethylene glycol (40-44 wt. %) in the proportions shown in Table 1. The mixture is heated and stirred until the reactor contents reach 200° C. The mixture is heated until no particles of recycled PET remain (about 4 h). When the digestion reaction is considered complete, the mixture is cooled to about 100° C. A mixture of maleic anhydride and either adipic acid or succinic acid is added (see Table 1 for amounts), and the mixing rate is increased (200 rpm). A Vigreux column and short-path distillation head are attached to the reactor in place of the condenser, and heating to 200° C. is resumed. Water generated in the condensation reaction is removed until roughly the theoretical amount is removed. When the reaction is complete, the polyol product is allowed to cool to 100° C. and is then decanted from the reactor and filtered through cheesecloth. Properties of the polyols appear in Table 1. As shown in the table, the polyols have 25-30 wt. % of recycled PET content, 0.5 to 2 reactive unsaturation sites per molecule, low color, and low viscosity when compared with a similar polyol made from maleic anhydride alone (Comparative Example 1).

In these examples, the maleic anhydride and adipic or succinic acid are added following digestion of the recycled PET with the diethylene glycol, as described above. However, if desired, the maleic anhydride and adipic/succinic acid can be added before digestion.

"Recycle and renewable content" as used herein (wt. %) is determined by combining the masses of recycled thermoplastic polyester and any other recycled or renewable components, and dividing this sum by the total mass of reactants (including the α,β-unsaturated monomer(s), adipic acid, and succinic acid), and then multiplying the result by 100.

Acid values are determined by ASTM D4663 and hydroxyl numbers are determined potentiometrically by DIN 53240-2. Number average molecular weights are calculated from the measured hydroxyl number.

Average reactive sites per molecule are calculated from the charged amount of maleic anhydride assuming that all of the α,β-unsaturated monomer(s) is/are incorporated into the polyester polyol product.

Viscosities are measured at 75° C. using a Brookfield DV-III Ultra rheometer with spindle #31 at 50% torque.

Products Made from the Maleate Polyester Polyols

1. Direct UV-Cured Coatings

The maleate polyester polyols of Comparative Example 1 and Examples 2-7 (Table 1) are used to formulate direct UV-cured coatings. Unlike conventional coatings, these are simple formulations produced without any polyisocyanate and without any acrylate component. The sole curing mechanism is through crosslinking from maleate unsaturation in the presence of UV light and a photoinitiator. Thus, coatings are formulated at 60% solids using the maleate polyester polyol (25 pbw), methyl ethyl ketone (15 pbw), and Irgacure® 1173 photoinitiator (product of BASF, 1 pbw). Samples are ambient flashed for 1 h, then UV-cured (3 passes at 5 ft/min with Heraeus Noblelight LC6B benchtop unit, H+ bulb) prior to testing. A comparative coating is produced using a urethane-acrylate resin. Polyester polyol 7, which has only about 0.5 reactive unsaturation sites per molecule, gives an uncured coating under the same conditions. Results are reported in Table 2.

As shown in Table 2, we surprisingly found that reasonably good coatings can be made directly from the maleate polyols. The findings are valuable because the maleate polyester polyols represent a low-cost alternative with fewer regulatory hurdles and fewer health and safety concerns when compared with acrylate or isocyanate-based coatings. Incorporation of some succinic acid or adipic acid with the maleic anhydride (Polyol Examples 2-6) appears to improve adhesion in the direct UV-cured coating when compared with use of an all-maleate polyol (Comparative Example 1). The inventive polyester polyols also improve the flexibility properties (mandrel bends, direct and indirect impact resistance) of the coatings when compared with the urethane-acrylate-based coating. Resistance to staining by Skydrol® fluid (a phosphate-based hydraulic fluid used in aircraft applications, product of Eastman), normally a difficult test, is also noteworthy.

2. UV-Cured Coatings from Blends of Maleate Polyols and Urethane-Acrylates

Two of the maleate polyester polyols (Polyols 4 and 7) are evaluated in UV-cured coatings when used as blends with 25-75 wt. % of a urethane-acrylate (see Table 3).

The coatings are formulated at 60% solids using the blend of maleate polyester polyol and urethane-acrylate (25 pbw), methyl ethyl ketone (15 pbw), and Irgacure® 1173 photoinitiator (1 pbw). Samples are ambient flashed for 1 h, then UV-cured (3 passes at 5 ft/min with Heraeus Noblelight LC6B benchtop unit, H+ bulb) prior to testing. A 100% urethane-acrylate coating is also made for comparison (far right column of Table 3).

As shown in Table 3, the coating from 100% urethane-acrylate has good chemical resistance but relatively poor flexibility and low impact resistance. When the maleate polyol from 25 mole % maleic anhydride/75 mole % adipic acid (Polyol 7) is used, the blend can tolerate about 25 wt.

% of the maleate polyol without sacrificing properties compared with the 100% urethane-acrylate control. However, when the maleate polyol from 75 mole % maleic anhydride/ 25 mole % adipic acid (Polyol 4) is used, substantial improvements in flexibility and impact resistance are achieved over the entire tested range of 25-75 wt. % maleate polyol in the maleate polyol/urethane-acrylate blend. The best overall results are seen when the maleate polyol is 75 wt. % of this blend. The results suggest that the inventive maleate polyester polyols can be blended with conventional urethane-acrylate materials to provide cost-effective coatings that cure with UV but have reduced reliance on acrylates.

3. Two-Component Bake HDI Trimer Coatings

The maleate polyester polyols are tested in two-component bake coatings (no UV cure) using HDI trimer as a crosslinking agent and a 1.0 NCO/OH index. Properties of the resulting coatings appear in Table 4.

In a typical example, the maleate polyol (11.8 g) is heated in a beaker and is diluted with methyl ethyl ketone (13 g) and propylene glycol methyl ether acetate (13 g). The mixture is stirred mechanically with gentle warming to obtain a homogeneous mixture. Vestanat® HT 2500/100 (HDI trimer, product of Evonik, 5.75 g) is added and mixed until homogeneous. Dibutyltin dilaurate (7.5 mg) is then added. After light mixing for 30 s, a bead of the reaction mixture is applied to one side of three aluminum panels (4"×6") and one cold-rolled steel panel (4"×12"). The beads of solvent-borne polyurethane are drawn down each panel into a wet film using a #50 R.D. Specialties bar to a wet-film thickness of 4.5 mils. The panels are allowed to flash dry in a hood at ambient temperature for at least 15 min., then placed in a 130° C. oven for 30 min. to complete conversion to the polyurethane. The panels are cured in a humidity chamber (25° C., 50% relative humidity) for 12 h before testing.

As shown in Table 4, the properties of the coatings are excellent across the board, indicating that the two-component bake procedure with HDI trimer is a relatively forgiving formulation. The results suggest that the inventive maleate polyester polyols can be used successfully in a traditional oven-cured system with polyisocyanate crosslinkers. Of course, an advantage of the maleate polyols is that they can cure under "UV only" conditions, which may be the only practical way to cure a coating, especially when large parts are involved.

4. UV-Cured Urethane-Acrylate Coatings

The maleate polyester polyols are combined with acrylates and isocyanates to make a traditional urethane-acrylate coating.

In a typical example, an inventive maleate polyester polyol (148 g) is combined in a reaction vessel with 1,6-hexanediol diacrylate (59.1 g), and the mixture is heated to 70° C. with stirring until homogeneous. The mixture is cooled to 40° C., and a urethane catalyst (K-KAT® 348 bismuth carboxylate catalyst, 0.15 g, product of King Industries) is added. Isophorone diisocyanate (68.2 g, 1.5 NCO/OH index) is added, and the mixture is heated to 70° C. and held for 30 minutes at 70° C. 2-Hydroxyethyl acrylate (23.7 g) is then added to cap the free NCO groups and produce the desired urethane-acrylate resin. To produce coatings, the urethane-acrylate resins are cured by UV (3 passes at 5 ft/min with Heraeus Noblelight LC6B benchtop unit, H+ bulb). Properties of the resulting coatings appear in Table 5.

As shown in Table 5, the use of maleate polyester polyols that incorporate 25-75 mole % of adipic acid or succinic acid (based on the combined molar amounts of maleic anhydride and either adipic acid or succinic acid) provide improved flexibility and better impact resistance compared with coatings formulated from an all-maleate polyester polyol. The results demonstrate that the inventive maleate polyester polyols can be used successfully in a traditional UV-curable urethane-acrylate formulation.

5. Combination Bake and UV-Cured HDI Trimer Coatings

The maleate polyester polyols are formulated as HDI trimer coatings that are cured using a combination of UV and heat.

In a typical example, the maleate polyester polyol (10.8 g) is heated in a beaker and is diluted with methyl ethyl ketone (13 g) and propylene glycol methyl ether acetate (13 g). The mixture is stirred mechanically with gentle warming to obtain a homogeneous mixture. Vestanat® HT 2500/100 (HDI trimer, product of Evonik, 5.75 g) is added and mixed until homogeneous. Dibutyltin dilaurate (7.5 mg) and Irgacure® 1173 photoinitiator (0.75 g) are then added.

After light mixing for 30 s, a bead of the reaction mixture is applied to one side of three aluminum panels (4"×6") and one cold-rolled steel panel (4"×12"). The beads of solvent-borne polyurethane are drawn down each panel into a wet film using a #50 R.D. Specialties bar to a wet-film thickness of 4.5 mils. The panels are allowed to flash dry in a hood at ambient temperature for at least 15 min. The panels are then UV cured (3 passes at 5 ft/min with Heraeus Noblelight LC6B benchtop unit, H+ bulb). Thereafter, the panels are placed in a 130° C. oven for 30 min. to complete conversion to the polyurethane. The panels are cured in a humidity chamber (25° C., 50% relative humidity) for 12 h before testing.

As shown in Table 6, the overall properties of the resulting dual-cured coatings are excellent.

6. UV-Cured Coatings from Polyurethane Dispersions (PUDs)

The maleate polyester polyols are tested for their performance in aqueous polyurethane dispersions and UV-cured coatings made from the dispersions.

In a typical example, the maleate polyol (see Table 7, 18.9 wt. %), dimethylolpropionic acid (0.9 wt. %), Ymer™ N120 surfactant (5.8 wt. %, product of Perstorp), K-KAT® 348 bismuth carboxylate catalyst (0.03 wt. %), and N-methyl-2-pyrrolidone (2.0 wt. %) are charged to a reaction vessel equipped with mechanical stirring, condenser, temperature controller, and nitrogen inlet. The reactor contents are heated to 40-50° C. When the mixture becomes homogeneous, isophorone diisocyanate (10.4 wt. %) is added. The reactor temperature is increased to 85° C. and held until the free NCO content is within the range of 2.7-2.9 wt. %. The reaction mixture is cooled to 75-80° C. The mixing rate is increased to 1200 rpm, and triethylamine (1.0 wt. %) is added and held for 5 min. The mixing rate is increased to 1800 rpm, and hot (70-75° C.) water (60.0 wt. %) is added. When the dispersion has formed, diethylene glycol (0.8 wt. %) is added. The mixing rate is reduced to 800 rpm, and the dispersion is allowed to cool to 40-50° C. The product is filtered through a medium-mesh paint filter to give the finished polyurethane dispersion.

To produce the UV-cured coatings, PUD samples are combined with 3 wt. % Irgacure® 1173 photoinitiator, then drawn over aluminum substrates with a 5-mil draw bar. Films are flashed for 24 hours at ambient temperature, then UV cured (3 passes at 5 ft/min with Heraeus Noblelight LC6B benchtop unit, H+ bulb). Properties of the coatings are summarized in Table 7.

As shown in Table 7, the inventive maleate polyester polyols can be used successfully to produce coatings from a traditional aqueous polyurethane dispersion.

Testing Methods for Coatings:

Dry film thickness is determined using a PosiTector 6000 (Defelsko Corporation) dry film thickness gauge. König hardness is measured using ISO 1522 using a TQC pendulum hardness tester (Model SPO500). The following ASTM test methods are used: pencil scratch hardness: ASTM D3363; flexibility: ASTM D522; adhesion: ASTM D3359; stain testing: ASTM D1308; and liquid resin viscosity: ASTM D562.

TABLE 1

UV-Curable Maleate Polyester Polyols

| Polyester Polyol Example | C1 | 2 | 3 | 4 | 5 | 6 | 7 |
|---|---|---|---|---|---|---|---|
| rPET, wt. % | 28.2 | 27.8 | 28.0 | 27.4 | 27.8 | 26.6 | 25.8 |
| Diethylene glycol, wt. % | 43.7 | 43.0 | 43.4 | 42.3 | 43.1 | 41.1 | 40.0 |
| Maleic anhydride, wt. % | 28.0 | 24.0 | 24.3 | 20.2 | 20.7 | 12.9 | 6.2 |
| Adipic acid, wt. % | 0 | 5.1 | 0 | 10.0 | 0 | 19.3 | 27.9 |
| Succinic acid, wt. % | 0 | 0 | 4.2 | 0 | 8.3 | 0 | 0 |
| Mol % maleic anhydride = MAn/(MAn + AA or SA) × 100 | 100 | 87.5 | 87.5 | 75.0 | 75.0 | 50.0 | 25.0 |
| Ti butoxide, ppm | 1500 | 1500 | 1500 | 1500 | 1500 | 1500 | 1500 |
| OH #, mg KOH/g | 118 | 135 | 130 | 135 | 143 | 140 | 150 |
| Mn, g/mol | 950 | 831 | 884 | 831 | 787 | 801 | 748 |
| Reactive sites per molecule | 2.86 | 2.15 | 2.3 | 1.81 | 1.77 | 1.13 | 0.51 |
| Recycle/renewable content | 72 | 76 | 76 | 70 | 79 | 68 | 66 |
| Gardner color | 4 | 2 | 2 | 2 | 2 | 2 | 2 |
| Viscosity, cP, 75° C. | 2000 | 1115 | 1200 | 745 | 900 | 450 | 300 |

TABLE 2

UV-Cured Coatings from Maleate Polyester Polyols

| Polyester Polyol Example | UA | C1 | 2 | 3 | 4 | 5 | 6 |
|---|---|---|---|---|---|---|---|
| Film appearance | Clear | Clear | Clear | Clear | Clear | Clear | Wrinkly |
| Dry film thickness, mil | 1.90 | 1.86 | 1.63 | 2.02 | 1.37 | 1.73 | 1.32 |
| König hardness, s | 93 | 28 | 59 | 40 | 50 | 37 | 27 |
| Pencil hardness | F | HB | <6B | 3B | <6B | 3B | <6B |
| Cross-hatch adhesion | 0B | 0B | 4B | 4B | 1B | 4B | 5B |
| Mandrel ⅛" | Fail | Pass | Pass | Pass | Pass | Pass | Pass |
| Mandrel ¼" | Fail | Pass | Pass | Pass | Pass | Pass | Pass |
| Vinegar 1 h and 1 h recovery | 3, 4 | 3, 3 | 3, 3 | 3, 5 | 2, 2 | 3, 5 | 3, 4 |
| Windex ® 1 h and 1 h recovery | 3, 4 | 3, 4 | 3, 3 | 2, 2 | 3, 5 | 3, 4 | 3, 3 |
| 50% EtOH 1 h and 1 h recovery | 2, 2 | 2, 2 | 2, 2 | 2, 2 | 2, 3 | 2, 2 | 3, 3 |
| Skydrol ® 1 h and 1 h recovery | 5, 5 | 5, 5 | 5, 5 | 5, 5 | 5, 5 | 5, 5 | 4, 4 |
| Betadine ® 1 h and 1 h recovery | 3, 4 | 3, 4 | 3, 3 | 3, 4 | 2, 3 | 3, 4 | 3, 4 |
| Water 1 h and 1 h recovery | 3, 2 | 3, 4 | 3, 4 | 3, 4 | 2, 3 | 3, 4 | 3, 4 |
| MEK double rubs, damage | >200 | >200 | 190 | >200 | 10 | 111 | 2 |
| MEK double rubs, break | >200 | >200 | 190 | >200 | 30 | 159 | 49 |
| Direct impact | 40 | 140 | 100 | 140 | <10 | 140 | 160 |
| Indirect impact | 10 | 140 | 160 | 140 | 10 | 100 | 160 |

UA = urethane-acrylate coating (comparative).
Polyester polyol 7 gave an uncured coating under the same conditions.
Coatings formulated at 60% solids using 25 parts of polyester polyol, 15 parts of methyl ethyl ketone, and 1 part Irgacure ® 1173 photoinitiator.
Samples are ambient flashed for 1 h, then UV-cured (3 passes at 5 ft/min with Heraeus Noblelight LC6B benchtop unit, H+ bulb) prior to testing.
Skydrol ® hydraulic fluid, product of Eastman.
Betadine ® povidone iodine, product of Purdue Products.
Windex ® ammonia cleaner, product of S. C. Johnson.

TABLE 3

UV-Cured Coatings from Blends of Maleate Polyester Polyols and Urethane-acrylate Resin

| | Polyester Polyol from Example | | | | | | |
|---|---|---|---|---|---|---|---|
| | 7 | 7 | 7 | 4 | 4 | 4 | UA |
| | Mol % maleic anhydride = MAn/(MAn + AA) × 100 | | | | | | |
| | 25 | 25 | 25 | 75 | 75 | 75 | 0 |
| | Wt. % Polyester polyol in blend | | | | | | |
| | 75 | 50 | 25 | 75 | 50 | 25 | 0 |
| | Wt. % Urethane-acrylate in blend | | | | | | |
| | 25 | 50 | 75 | 25 | 50 | 75 | 100 |
| Film appearance | Clear | Clear | Clear | Clear | Clear | Clear | Clear |
| Dry film thickness, mil | 1.50 | 1.78 | 1.78 | 1.83 | 1.93 | 2.03 | 1.90 |
| König hardness, s | 7 | 23 | 52 | 34 | 34 | 61 | 93 |
| Pencil hardness | <6B | <6B | 2B | <6B | B | F | F |
| Cross-hatch adhesion | 5B | 1B | 1B | 1B | 0B | 0B | 0B |
| Mandrel ⅛" | Pass | Fail | Fail | Pass | Fail | Fail | Fail |
| Mandrel ¼" | Pass | Pass | Pass | Pass | Pass | Pass | Fail |
| Vinegar 1 h and 1 h recovery | 3, 3 | 3, 4 | 3, 4 | 2, 2 | 3, 4 | 3, 4 | 3, 4 |
| Windex ® 1 h and 1 h recovery | 2, 3 | 3, 4 | 3, 4 | 3, 5 | 3, 4 | 3, 4 | 3,4 |
| 50% EtOH 1 h and 1 h recovery | 2, 3 | 2, 2 | 2, 2 | 2, 4 | 3, 4 | 2, 2 | 2, 2 |
| Skydrol ® 1 h and 1 h recovery | 4, 4 | 5, 5 | 5, 5 | 5, 5 | 5, 5 | 5, 5 | 5, 5 |
| Betadine ® 1 h and 1 h recovery | 2, 3 | 3, 4 | 3, 4 | 3, 4 | 3, 4 | 3, 4 | 3, 4 |
| Water 1 h and 1 h recovery | 3, 4 | 3, 2 | 2, 2 | 2, 2 | 2, 2 | 3, 2 | 3, 2 |
| MEK double rubs, damage | 7 | 88 | >200 | >200 | >200 | >200 | >200 |
| MEK double rubs, break | 81 | 124 | >200 | >200 | >200 | >200 | >200 |
| Direct impact | <10 | <10 | 80 | 160 | 140 | 80 | 40 |
| Indirect impact | <10 | 20 | 60 | 160 | 120 | 20 | 10 |

UA = urethane-acrylate coating (comparative).

Coatings formulated at 60% solids using 25 parts of polyester polyol blend with urethane-acrylate, 15 parts of methyl ethyl ketone, and 1 part Irgacure ® 1173 photoinitiator.

Samples are ambient flashed for 1 h, then UV-cured (3 passes at 5 ft/min with Heraeus Noblelight LC6B benchtop unit, H+ bulb) prior to testing.

Skydrol ® hydraulic fluid, product of Eastman.

Betadine ® povidone iodine, product of Purdue Products.

Windex ® ammonia cleaner, product of S. C. Johnson.

TABLE 4

2K Bake HDI Trimer Coatings from Maleate Polyester Polyols (no UV cure, 1.0 NCO/OH index)

| Polyester Polyol Example | C1 | 2 | 3 | 4 | 5 | 6 | 7 |
|---|---|---|---|---|---|---|---|
| Film appearance | Clear | Clear | Clear | Clear | Clear | Clear | Clear |
| Dry film thickness, mil | 0.84 | 1.33 | 1.18 | 1.19 | 1.23 | 1.20 | 1.11 |
| König hardness, s | 19 | 10 | 18 | 10 | 14 | 18 | 29 |
| Pencil hardness | H | H | H | H | H | H | H |
| Cross-hatch adhesion | 5B | 5B | 5B | 5B | 5B | 5B | 5B |
| Mandrel ⅛" | Pass | Pass | Pass | Pass | Pass | Pass | Pass |
| Mandrel ¼" | Pass | Pass | Pass | Pass | Pass | Pass | Pass |
| Vinegar 1 h | 5 | 5 | 5 | 5 | 5 | 5 | 5 |
| Windex ® 1 h | 5 | 5 | 5 | 5 | 5 | 5 | 5 |
| 50% EtOH 1 h | 5 | 5 | 5 | 5 | 5 | 5 | 5 |
| Skydrol ® 1 h | 5 | 5 | 5 | 5 | 5 | 5 | 4 |
| Betadine ® 1 h | 5 | 4 | 5 | 5 | 4 | 5 | 4 |
| Water 1 h | 5 | 5 | 5 | 5 | 5 | 5 | 5 |
| MEK double rubs, break | 84 | 72 | 110 | 67 | 85 | 69 | 51 |
| Direct impact | 160 | 160 | 160 | 160 | 160 | 160 | 160 |
| Indirect impact | 160 | 160 | 160 | 160 | 160 | 160 | 160 |

Skydrol ® hydraulic fluid, product of Eastman.

Betadine ® povidone iodine, product of Purdue Products.

Windex ® ammonia cleaner, product of S. C. Johnson.

TABLE 5

Urethane-Acrylate Coatings from Maleate Polyester Polyols (UV cure)

| Polyester Polyol Example | C1 | 2 | 4 | 5 | 6 | 7 |
|---|---|---|---|---|---|---|
| Film appearance | | | | | | |
| Dry film thickness, mil | | | | | | |
| König hardness, s | 179 | 183 | 91 | 181 | 79 | 80 |
| Pencil hardness | 3H | 3H | H | 3H | F | F |
| Cross-hatch adhesion | 1B | 3B | 1B | 3B | 1B | 3B |
| Mandrel ⅛" | Fail | Pass | Pass | Pass | Pass | Pass |
| Mandrel ¼" | Fail | Pass | Pass | Pass | Pass | Pass |
| Vinegar 1 h | 5 | 5 | 5 | 5 | 5 | 5 |
| Windex ® 1 h | 5 | 5 | 5 | 5 | 5 | 5 |
| 50% EtOH 1 h | 5 | 5 | 5 | 5 | 5 | 5 |
| Water 1 h | 5 | 5 | 5 | 5 | 5 | 5 |
| MEK double rubs, break | >200 | >200 | >200 | >200 | >200 | >200 |
| Direct impact | <10 | 120 | 60 | 80 | >160 | >160 |
| Indirect impact | <10 | 100 | 40 | 60 | >160 | >160 |

Urethane-acrylate samples are prepared using a 1.5 IPDI/OH index.
Remaining free NCO groups are then capped with 2-hydroxyethyl acrylate, and the resulting urethane-acrylate resin is cured by UV (3 passes at 5 ft/min with Heraeus Noblelight LC6B benchtop unit, H+ bulb).
Windex ® ammonia cleaner, product of S. C. Johnson.

TABLE 6

Combination Bake and UV Cured HDI Trimer Coatings from Maleate Polyester Polyols (1.0 NCO/OH index)

| Polyester Polyol Example | C1 | 2 | 3 | 4 | 5 | 6 | 7 |
|---|---|---|---|---|---|---|---|
| Film appearance | Clear | Clear | Clear | Clear | Clear | Clear | Clear |
| Dry film thickness, mil | 1.44 | 1.52 | 1.43 | 1.34 | 1.44 | 1.38 | 1.40 |
| König hardness, s | 212 | 200 | 209 | 199 | 203 | 108 | 21 |
| Pencil hardness | H | F | H | F | H | B | 5B |
| Cross-hatch adhesion | 0B-1B | 4B | 1B | 4B | 1B | 4B-5B | 5B |
| Mandrel ⅛" | Fail | Fail | Pass | Pass | Fail | Pass | Pass |
| Mandrel ¼" | Pass | Pass | Pass | Pass | Pass | Pass | Pass |
| Vinegar 1 h | 5 | 5 | 5 | 5 | 5 | 5 | 5 |
| Windex ® 1 h | 5 | 5 | 5 | 5 | 5 | 5 | 5 |
| 50% EtOH 1 h | 5 | 5 | 5 | 5 | 5 | 5 | 5 |
| Skydrol ® 1 h | 5 | 5 | 5 | 5 | 5 | 5 | 5 |
| Betadine ® 1 h | 5 | 5 | 5 | 5 | 5 | 5 | 5 |
| Water 1 h | 5 | 5 | 5 | 5 | 5 | 5 | 5 |
| MEK double rubs, break | >200 | >200 | >200 | >200 | >200 | >200 | 138 |
| Direct impact | 160 | 160 | 160 | 160 | 160 | 160 | 160 |
| Indirect impact | 160 | 160 | 160 | 160 | 160 | 160 | 160 |

Polyester polyol is combined with HDI trimer, solvent, and photoinitiator, applied as a coating, flashed for 15 min. at ambient temperature, UV cured (3 passes at 5 ft/min with Heraeus Noblelight LC6B benchtop unit, H+ bulb), then baked 30 min. at 130° C.
Skydrol ® hydraulic fluid, product of Eastman.
Betadine ® povidone iodine, product of Purdue Products.
Windex ® ammonia cleaner, product of S. C. Johnson.

TABLE 7

UV-Cured Coatings from Polyurethane Dispersions

| Polyester Polyol Example | 2 | 3 | 4 | 5 | 7 |
|---|---|---|---|---|---|
| Film appearance | Clear | Clear | Clear | Clear | Clear |
| Dry film thickness, mil | 1.1 | 1.3 | 1.3 | 1.2 | 1.0 |
| Konig hardness, s | 125 | 115 | 87 | 106 | 32 |
| Pencil hardness | HB | HB | B | F | 4B |
| Mandrel ⅛" | pass | pass | pass | pass | pass |
| Mandrel ¼" | pass | pass | pass | pass | pass |
| Vinegar 1 h | 2 | 3 | 3 | 2 | 2 |
| Windex ® 1 h | 2 | 3 | 3 | 2 | 2 |
| 50% EtOH 1 h | 2 | 2 | 3 | 2 | 2 |
| Water 24 h | 3 | 3 | 3 | 3 | 3 |
| MEK double rubs, break | >200 | >200 | >200 | >200 | 57 |

PUDs are formulated with 3 wt. % Irgacure ® 1173 photoinitiator, then drawn over aluminum substrates with a 5-mil draw bar. Films are flashed for 24 hours at ambient temperature, then UV cured (3 passes at 5 ft/min with Heraeus Noblelight LC6B benchtop unit, H+ bulb). Windex ® ammonia cleaner, product of S.C. Johnson.

Polyester Polyols for Rigid Foams—General Procedure

A reaction flask equipped with mechanical stirrer, Vigreux column, short-path distillation head, heating mantle, thermocouple, and nitrogen inlet is charged with recycled polyethylene terephthalate and glycols or other hydroxy-functional monomers. Half of the desired catalyst weight is added. The mixture is heated to 200-225° C. until no particles of recycled PET remain, typically about 4 h. When the digestion reaction is considered complete, the mixture is cooled to about 100° C. All remaining carboxylic acids, hydrophobes, and more catalyst are added to the reactor, which is heated to 200-225° C. with moderate mixing. When the head temperature of the distillate dips below 50° C., the Vigreux column is removed and the short-path distillation head is attached directly to the reactor. Heating continues until the measured acid value is less than 2 mg KOH/g (8-16 h). The mixture is cooled to 100° C. and poured through a 5-micron bag filter. The final product is tested for hydroxyl value (DIN 53240-2), acid value (ASTM D4662), Gardner color (ASTM D1544), density (ASTM D1475), and Brookfield viscosity. Preparation details and properties of the polyols appear in Table 8.

Preparation of PIR and PU Rigid Foams

The "B-side" components of the formulation are combined in a stainless-steel beaker by first adding the polyol(s), then tris(chloropropyl)phosphate, surfactants, catalysts, and water. The components are blended well for one minute at 2,000 rpm. Blowing agent is then added with mixing at 1,000-2,000 rpm. After 20-60 s, additional blowing agent is added and mixed to achieve the desired target weight. Polymeric MDI (avg. isocyanate functionality=2.7) is added to the B-side components, and the mixture is immediately blended with an overhead mixer. For polyisocyanurate foams, the mixer is on for 15 s at 2,000 rpm; for polyurethane spray foams, the mixer is on for 5 s at 2,000 rpm. The reaction mixture is poured into a 165-oz. paper bucket. Cream time, gel time, rise time, and tack-free times are noted to create a reactivity profile. After 24 h, the foam is cut on a band saw to obtain pieces required for measuring core density (ASTM D1622), compressive strength (ASTM D1621) and modified vertical burn testing (California TB-117). Processing details, physical properties, and flammability properties for the rigid foams are summarized in Tables 9-14.

Polyisocyanurate (PIR) Foam Formulation:

Polyol(s) (100 parts), tris(chloropropyl)phosphate (17 parts), DABCO® K-15 catalyst (2 parts, product of Evonik), POLYCAT® 5 amine catalyst (0.15 parts, Evonik), TEGOSTAB® B8465 surfactant (3 parts, Evonik), water (0.35 parts), pentane (19 parts), LUPRANATE® 20 polymeric MDI (to 2.6 index, product of BASF).

Polyurethane (PU) Spray Foam Formulation:

Polyol(s) (100 parts), tris(chloropropyl)phosphate (10 parts), DABCO® 33-LV catalyst (0.3 parts, Evonik), POLYCAT 5 amine catalyst (0.5 parts), TEGOSTAB B8465 surfactant (3 parts), water (0.35 parts), SOLSTICE® LBA blowing agent (12 parts, product of Honeywell), LUPRANATE 20 polymeric MDI (to 1.2 index).

Modified California Technical Bulletin 117 Flame Spread Test

The flame spread test is conducted on three samples, each cut to 3"×7"×0.5". Samples are suspended 0.75" above a Bunsen burner while the flame from the burner is set to 1.5" of flame height. The burner is moved directly under the vertical sample, held for 12 s, and is then removed. The time for the flame to go out is recorded using a video camera and a stopwatch. The test is conducted in a draft-free setting within a fume hood. Initial and post-burn mass are recorded to calculate the percent mass loss. Scans at 300 dpi resolution of the post-burn samples are made and analyzed using ImageJ (public domain) software to determine % char area.

Oriented Strand Board (OSB) Coatings

Polyurethane OSB Coating Formulations:

1. Maleate polyol (41.9 g, OH value=140 mg KOH/g), DABCO® T-12 catalyst (5 wt. % in butyl acetate, product of Evonik, 0.33 g), Hi Sol™ 10 solvent (5.0 g, product of PowerKleen), butyl acetate (5.0 g), INCOZOL™ 2 moisture scavenger (1.5 g, product of Incorez), LUPRANATE® M20 isocyanate (18.2 g, 1.30 index, product of BASF).

2. Maleate polyol (41.9 g, OH value=140 mg KOH/g), DABCO® T-12 catalyst (5 wt. % in butyl acetate, 0.15 g), Hi Sol™ 10 petroleum distillate (5.0 g), butyl acetate (5.0 g), INCOZOL™ 2 moisture scavenger (1.5 g), LUPRANATE® M20 isocyanate (22.4 g, 1.60 index).

OSB Coating Preparation and Testing

A mixing cup designed for use with a THINKY™ ARE-250 speed mixer is used to prepare a formulation for an oriented strand board coating. The polyol, catalyst, and solvents are added to the cup and mixed for 2 minutes. The sample is allowed to cool to room temperature before adding LUPRANATE® M20. Once the isocyanate is added, the contents are mixed for 20 seconds. A paint brush is used to apply a thin coating on all sides of a piece of OSB cut to 3"×7"×0.625". The coating cures for at least 24 h before evaluation in the CA TB-117 test. Results appear in Table 15.

TABLE 8

Maleate Polyester Polyols for Rigid PIR and PU Foams

| Polyester Polyol Ex. | 8 | 9 | 10 | 11 | 12 | 13 | C14 | C15* | C16 | C17 |
|---|---|---|---|---|---|---|---|---|---|---|
| rPET, wt. % | 25.8 | 30.8 | 23.2 | 25.5 | 25.7 | 32.3 | 30.0 | — | 35.0 | — |
| Diethylene glycol, wt. % | 40.0 | 48.4 | 16.3 | 39.4 | 39.7 | 33.3 | 13.1 | — | 30.5 | 47.4 |
| Glycerol | — | — | — | — | — | — | — | — | — | 2.1 |
| PEG 200, wt. % | — | — | 36.8 | — | — | — | 27.2 | 81.8 | — | — |
| Maleic anhydride, wt. % | 6.2 | 16.9 | 6.8 | — | — | 1.9 | — | 18.1 | — | — |
| Itaconic acid, wt. % | — | — | — | 8.2 | — | — | — | — | — | — |
| Fumaric acid, wt. % | — | — | — | — | 7.3 | — | — | — | — | — |
| Adipic acid, wt. % | 27.9 | 3.8 | — | 26.8 | 27.2 | 16.4 | 1.1 | — | 11.4 | 17.2 |
| Succinic acid, wt. % | — | — | 16.8 | — | — | — | — | — | — | — |
| Phthalic anhydride, wt. % | — | — | — | — | — | — | 15.0 | — | — | 23.1 |
| Soybean oil, wt. % | — | — | — | — | — | 10.5 | 9.0 | — | 15.0 | 10.0 |
| Lignin content? | N | N | N | N | N | Y | N | N | Y | N |
| Ti butoxide, ppm | 1500 | 1500 | 1000 | 1500 | 1500 | 1000 | 1000 | 1000 | 1000 | 1000 |
| OH #, mg KOH/g | 140 | 277 | 141 | 157 | 154 | 254 | 238 | 277 | 285 | 246 |
| Acid #, mg KOH/g | 0.9 | 0.8 | 0.2 | 1.8 | 1.7 | 0.6 | 2.5 | 0.3 | 0.7 | 0.3 |

TABLE 8-continued

Maleate Polyester Polyols for Rigid PIR and PU Foams

| Polyester Polyol Ex. | 8 | 9 | 10 | 11 | 12 | 13 | C14 | C15* | C16 | C17 |
|---|---|---|---|---|---|---|---|---|---|---|
| Functionality | 2.0 | 2.0 | 2.0 | 2.0 | 2.0 | 2.0 | 2.1 | 2.0 | 2.0 | 2.0 |
| Viscosity, cP, 25° C. | 13,000 | 7,000 | 16,600 | 8,000 | 9,000 | 5,800 | 8,800 | 925 | 4,700 | 1,260 |

*Produced using a one-step process.

TABLE 9

Effect of Maleate Polyol on PIR Rigid Foam Flammability

| Polyol ex. # | C14 | 8 | 9 | 10 | 11 | 12 |
|---|---|---|---|---|---|---|
| unsat. monomer | none | maleate | maleate | maleate | itaconate | fumarate |
| wt. % of control | 100 | 70 | 70 | 70 | 70 | 70 |
| wt. % of maleate polyol | 0 | 30 | 30 | 30 | 30 | 30 |
| blend OH#, mg KOH/g | 238 | 210 | 250 | 209 | 214 | 213 |
| Processing | | | | | | |
| rise time, s | 95 | 121 | 73 | 69 | 80 | 75 |
| tack free time, s | 136 | 179 | 112 | 180 | 112 | 131 |
| Foam properties | | | | | | |
| density, pcf | 1.83 | 1.67 | 1.78 | 1.82 | 1.93 | 1.83 |
| compressive strength, parallel, psi | 29.7 | 25.4 | 30.2 | 31.2 | 33.8 | 31.8 |
| % elongation | 5.6 | 5.7 | 6.9 | 6.2 | 7.5 | 8.4 |
| CA TB-117 | | | | | | |
| afterflame, s | 1.3 | 0.7 | 1.0 | 0 | 0.7 | 0 |
| char area, % | 22 | 12 | 16 | 11 | 17 | 9 |
| mass loss, % | 4.4 | 1.7 | 2.4 | 1.9 | 2.2 | 1.6 |

All foams made at 2.60 index.

The results in Table 9 demonstrate that inclusion of an α,β-unsaturated monomer in a polyester polyol based on recycled PET can improve the fire retardance of a rigid polyisocyanurate foam made from the polyester polyol. Overall, the CA TB-117 results indicate that foams made from blends of the inventive polyols with a control rPET polyol are faster to self-extinguish, have reduced charred areas, and lose less mass when compared with a foam made from the control polyol alone.

TABLE 10

Effect of Wt. % Maleate Polyol on Rigid PIR Foam Flammability

| | Polyol ex. # | | | | |
|---|---|---|---|---|---|
| | C14 | 8 | 8 | 8 | 8 |
| unsat. monomer | none | maleate | maleate | maleate | maleate |
| wt. % of control | 100 | 95 | 90 | 80 | 70 |
| wt. % of maleate polyol | 0 | 5 | 10 | 20 | 30 |
| blend OH#, mg KOH/g | 238 | 233 | 229 | 219 | 210 |
| Processing | | | | | |
| rise time, s | 95 | 97 | 98 | 96 | 121 |
| tack free time, s | 136 | 133 | 168 | 171 | 179 |
| Foam properties | | | | | |
| density, pcf | 1.83 | 1.74 | 1.79 | 1.84 | 1.67 |
| compressive strength, parallel, psi | 29.7 | 27.9 | 26.1 | 28.8 | 25.4 |
| % elongation | 5.6 | 6.3 | 6.7 | 7.1 | 5.7 |
| CA TB-117 | | | | | |
| afterflame, s | 1.3 | 1.0 | 1.7 | 1.0 | 0.7 |
| char area, % | 22 | 13 | 12 | 18 | 12 |
| mass loss, % | 4.4 | 2.2 | 2.4 | 3.9 | 1.7 |

All foams made at 2.60 index.

The results in Table 10 demonstrate that as little as 5 wt. % of inventive maleate polyol blended with the control can provide a substantial improvement in the CA TB-117 results for rigid PIR foams made from blends of the inventive polyols with a control polyester polyol based on rPET. Consistent with the nature of the test, the results are somewhat mixed in the 5 to 30 wt. % range tested. Overall, however, the test results indicate that foams made from blends of the inventive polyols with a control rPET polyol are faster to self-extinguish, have reduced charred areas, and lose less mass when compared with a foam made from the control polyol alone.

TABLE 11

Effect of Maleate Polyol on Rigid PIR Foam Flammability - Lignin Polyols

| | Polyol ex. # | | |
|---|---|---|---|
| | C16 | 8 | 13 |
| description | lignin polyol | lignin polyol blended with maleate polyol | lignin polyol with reacted maleate |
| wt. % of control | 100 | 70 | 0 |
| wt. % of maleate polyol | 0 | 30 | 100 |
| blend OH#, mg KOH/g | 285 | 245 | 254 |
| Processing | | | |
| rise time, s | 105 | 76 | 89 |
| tack free time, s | 119 | 132 | 118 |
| Foam properties | | | |
| density, pcf | 1.98 | 1.78 | 2.04 |
| compressive strength, parallel, psi | 35.6 | 28.8 | 36.0 |
| % elongation | 8.2 | 8.0 | 8.0 |
| CA TB-117 | | | |
| afterflame, s | 1.7 | 0.7 | 0.7 |
| char area, % | 17 | 19 | 15 |
| mass loss, % | 2.4 | 2.3 | 1.8 |

All foams made at 2.60 index.

Lignin-based polyols are naturally more fire retardant than their non-lignin analogs because of the polyaromatic structure of lignin. The results in Table 11 demonstrate that the fire retardance of a rigid PIR foam based on a lignin polyol can be further improved, at least marginally, by presence of an unsaturated monomer, especially when the monomer is used as a reactant for making the lignin-based polyol.

TABLE 12

The Value of Both rPET and Maleate in the Polyol

| | Polyol ex. # | | | |
|---|---|---|---|---|
| | 8 | C14 | C14 and C15 | C15 |
| description | rPET and maleate | rPET only | rPET blend w/ PEG maleate | PEG maleate only |
| wt. % of C14 control | 70 | 100 | 70 | 0 |
| wt. % of maleate polyol | 30 | 0 | 0 | 0 |
| wt. % C15 PEG maleate | 0 | 0 | 30 | 100 |
| blend OH#, mg KOH/g | 245 | 238 | 250 | 277 |
| Processing | | | | |
| rise time, s | 76 | 95 | 79 | 36 |
| tack free time, s | 132 | 136 | 133 | 50 |
| Foam properties | | | | |
| density, pcf | 1.78 | 1.83 | 1.87 | 2.12 |
| compressive strength, parallel, psi | 28.8 | 29.7 | 34.1 | 32.3 |
| % elongation | 8.0 | 5.6 | 6.1 | 9.1 |
| CA TB-117 | | | | |
| afterflame, s | 0.7 | 1.3 | 2.0 | 3.0 |
| char area, % | 19 | 22 | 34 | 30 |
| mass loss, % | 2.3 | 4.4 | 5.2 | 4.7 |

All foams made at 2.60 index.

The results in Table 12 demonstrate that both a recycled thermoplastic polyester (e.g., rPET) and maleate should be present in the polyol to achieve a desired improvement in fire retardance of the rigid PIR foam. When a polyol with high maleic content but no rPET content is used alone or as a blend with an rPET polyol, the resulting foam lacks desirable fire retardance. Also, when the rPET polyol has no maleate content, fire retardance is also poorer.

TABLE 13

Flammability of Rigid PIR Foams from a Blend of Maleate Polyol with Phthalate/Soybean Oil Polyol

| | Polyol ex. # | |
|---|---|---|
| | C17 | 8 |
| description | Phthalate/soybean oil polyol | Blend of C17 and maleate polyol 8 |
| wt. % of control | 100 | 70 |
| wt. % of maleate polyol | 0 | 30 |
| blend OH#, mg KOH/g | 246 | 215 |
| Processing | | |
| rise time, s | 83 | 82 |
| tack free time, s | 129 | 199 |
| Foam properties | | |
| density, pcf | 1.80 | 1.86 |
| compressive strength, parallel, psi | 26.1 | 28.0 |
| % elongation | 7.7 | 6.8 |
| CA TB-117 | | |
| afterflame, s | 0.7 | 1.0 |
| char area, % | 22 | 19 |
| mass loss, % | 4.0 | 3.1 |

All foams made at 2.60 index.

The results in Table 13 show that rigid polyisocyanurate foams produced from a phthalate/soybean oil polyol alone versus a phthalate/soybean oil polyol blended with 30 wt. % of an inventive maleate polyol have about the same fire retardance. Similar performance at a reduced hydroxyl number (from 246 to 215 mg KOH/g) is significant. The lower hydroxyl number polyol has a reduced isocyanate requirement to achieve the required index. The level of reduction in the isocyanate for the inventive example is 16 wt. % from the level of the comparative based on a B-side formulation having equivalent weight. Because the isocyanate is usually the more-expensive component, reducing the NCO requirement to achieve the same level of performance reduces cost of the rigid foam formulation, so equal performance from the blend is a desirable outcome.

TABLE 14

Effect of Maleate Polyol on Flammability of Rigid PU Spray Foam

| | Polyol ex. # | |
|---|---|---|
| | C18 | 8 |
| description | JEFFOL ® R-425X polyol[1] | Blend of C17 and maleate polyol 8 |
| wt. % of control | 100 | 80 |
| wt. % of maleate polyol | 0 | 20 |
| blend OH#, mg KOH/g | 425 | 369 |
| Processing | | |
| rise time, s | 30 | 43 |
| tack free time, s | 40 | 48 |

TABLE 14-continued

Effect of Maleate Polyol on Flammability of Rigid PU Spray Foam

| | Polyol ex. # | |
|---|---|---|
| | C18 | 8 |
| Foam properties | | |
| density, pcf | 2.30 | 2.42 |
| compressive strength, parallel, psi | 41.7 | 41.1 |
| % elongation | 7.4 | 6.4 |
| CA TB-117 | | |
| afterflame, s | 9 | 9 |
| char area, % | 82 | 71 |
| mass loss, % | 12 | 12 |

[1]Product of Huntsman. All foams made at 1.20 index.

The results in Table 14 demonstrate that a reduction in char area can be obtained when a minor proportion of maleate polyol is blended with a high hydroxyl number polyol, such as JEFFOL® R-425X. Similar performance at a reduced hydroxyl number (from 425 to 369 mg KOH/g) is significant. As with the polyisocyanurate foam examples of Table 13, the lower hydroxyl number polyol has a reduced isocyanate requirement to achieve the required index. The level of reduction in the isocyanate for the inventive example is 9.5 wt. % from the level of the comparative based on a B-side formulation having equivalent total weight. Because the isocyanate is usually the more-expensive component, reducing the NCO requirement to achieve the same level of performance reduces cost of the PU spray foam. If a higher level of foam performance is needed, a maleate polyol with a higher hydroxyl number (and a formulation at higher NCO index) could be used.

TABLE 15

Flammability of Coated Oriented Strand Board (2K PU wood coating)

| Description | NCO index | polyol wt. % maleate | polyol OH # mg KOH/g | Modified ASTM D3804 Afterflame (s) | Char area (%) |
|---|---|---|---|---|---|
| Control (no coating) | — | — | — | 260 | 30 |
| Maleate 1 | 1.3 | 58 | 140 | 44 | 8.0 |
| Maleate 2 | 1.6 | 55 | 140 | 28 | 7.8 |

As shown in Table 15, the flammability properties of the oriented strand boards are significantly improved by a polyurethane coating produced from the inventive maleate polyols even without adding a conventional flame retardant. A higher index coating may afford some improvement in fire retardance.

The preceding examples are meant only as illustrations; the following claims define the inventive subject matter.

We claim:

1. A polyester polyol comprising recurring units of:
    (a) a digested thermoplastic polyester;
    (b) a diol;
    (c) 5 to 95 mole % of an α,β-unsaturated monomer; and
    (d) 5 to 95 mole % of adipic acid, succinic acid, or a mixture thereof;
    wherein the mole % ranges for (c) and (d) are based on the combined molar amounts of (c) and (d);
    wherein the polyol has a hydroxyl number within the range of 25 to 450 mg KOH/g, an average of 0.5 to 2.5 reactive unsaturation sites per molecule, and a viscosity less than 1500 cP at 75° C.; and
    wherein the polyol is thermally curable or energy-curable.

2. The polyol of claim 1 wherein the thermoplastic polyester is selected from the group consisting of polyethylene terephthalate; polybutylene terephthalate; polytrimethylene terephthalate; glycol-modified polyethylene terephthalate; copolymers of terephthalic acid and 1,4-cyclohexanedimethanol; isophthalic acid-modified copolymers of terephthalic acid and 1,4-cyclohexanedimethanol; copolymers of 2,2,4,4-tetramethyl-1,3-cyclobutanediol with isophthalic acid, terephthalic acid or orthophthalic acid derivatives; polyhydroxyalkanoates; polyethylene furanoate; dihydroferulic acid polymers; and mixtures thereof.

3. The polyol of claim 1 wherein the thermoplastic polyester is selected from the group consisting of virgin PET, recycled PET, virgin PETG, recycled PETG, and mixtures thereof.

4. The polyol of claim 1 wherein the diol is selected from the group consisting of ethylene glycol, propylene glycol, 1,3-propanediol, 1,2-butylene glycol, 1,3-butylene glycol, 1,4-butanediol, 2,2,4,4-tetramethyl-1,3-cyclobutanediol, 2-methyl-1,3-propanediol, 1,6-hexanediol, pentaerythritol, neopentyl glycol, glycerol, trimethylolpropane, 3-methyl-1,5-pentanediol, 1,4-cyclohexanedimethanol, 1,3-cyclohexanedimethanol, bisphenol A ethoxylates, diethylene glycol, tetraethylene glycol, dipropylene glycol, triethylene glycol, tripropylene glycol, polyethylene glycols having a number average molecular weight up to about 400 g/mol, block or random copolymers of ethylene oxide and propylene oxide, and mixtures thereof.

5. The polyol of claim 1 wherein the molar ratio of diol to thermoplastic polyester is within the range of 1.5 to 4.5.

6. The polyol of claim 1 comprising 25 to 95 mole % of the α,β-unsaturated monomer and 5 to 75 mole % of adipic acid, succinic acid, or a mixture thereof.

7. The polyol of claim 1 wherein the α,β-unsaturated monomer is selected from the group consisting of maleic anhydride, maleic acid, fumaric acid, itaconic acid, itaconic anhydride, alkyl esters thereof, substituted derivatives thereof, and mixtures thereof.

8. The polyol of claim 1 wherein the α,β-unsaturated monomer is selected from the group consisting of acrylic acid, methacrylic acid, sorbic acid, methylene malonic acid, muconic acid, anhydrides thereof, alkyl esters thereof, substituted derivatives thereof, and mixtures thereof.

9. The polyol of claim 1 wherein the polyol comprises 5 to 35 wt. % of digested thermoplastic polyester recurring units based on the amount of polyester polyol.

10. The polyol of claim 1 having a hydroxyl number within the range of 25 to 350 mg KOH/g.

11. The polyol of claim 1 wherein the polyol is energy-curable essentially in the absence of a photoinitiator.

12. A polyester polyol comprising recurring units of:
    (a) an aromatic dicarboxylate source;
    (b) a diol;
    (c) 5 to 95 mole % of an α,β-unsaturated monomer; and
    (d) 5 to 95 mole % of adipic acid, succinic acid, or a mixture thereof;
    wherein the mole % ranges for (c) and (d) are based on the combined molar amounts of (c) and (d);
    wherein the polyol has a hydroxyl number within the range of 25 to 450 mg KOH/g, an average of 0.5 to 2.5 reactive unsaturation sites per molecule, and a viscosity less than 1500 cP at 75° C.; and
    wherein the polyol is thermally curable or energy-curable.

13. An acrylate-free, isocyanate-free coating made by energy-curing the polyol of claim 1, optionally in the presence of a photoinitiator.

14. An acrylate-free polyurethane or polyisocyanurate coating made by reacting the polyol of claim 1 with a polyisocyanate, a polyisocyanate dimer, or a polyisocyanate trimer under thermal conditions, energy-curing conditions, or both.

15. A coating made by reacting a blend comprising a urethane-(meth)acrylate resin and the polyol of claim 1 under thermal conditions, energy-curing conditions, or both, optionally in the presence of a polyisocyanate, a polyisocyanate dimer, or a polyisocyanate trimer.

16. A urethane-(meth)acrylate resin made by:
(a) reacting the polyol of claim 1 with a polyisocyanate, a polyisocyanate dimer, or a polyisocyanate trimer to give an intermediate; and
(b) reacting the intermediate with a hydroxyalkyl (meth)acrylate monomer to give the resin.

17. A coating made from the resin of claim 16.

18. An aqueous polyurethane dispersion made from the polyol of claim 1.

19. A coating made from the polyurethane dispersion of claim 18.

20. A blend comprising a mono- or poly(meth)acrylate with the polyol of claim 1.

21. A coating made from the blend of claim 20.

22. A non-isocyanate polyurethane made from the polyol of claim 1.

23. A rigid polyisocyanurate foam or a rigid polyurethane foam made from the polyol of claim 1.

24. A rigid polyisocyanurate foam or a rigid polyurethane foam prepared from a polyol blend comprising:
(a) the polyol of claim 1; and
(b) at least one other polyol;
wherein the fire retardance of the rigid polyisocyanurate foam or rigid polyurethane foam as measured by CA TB-117 is improved versus a rigid polyisocyanurate foam or rigid polyurethane foam prepared from a polyol or polyol blend without the use of the polyol in (a).

25. A method for improving the fire retardance as measured by CA TB-117 of a rigid polyisocyanurate foam or a rigid polyurethane foam, the method comprising formulating the foam to include as a polyol component the polyol of claim 1.

* * * * *